US012770645B2

(12) United States Patent
Nakagawa et al.

(10) Patent No.: US 12,770,645 B2
(45) Date of Patent: Oct. 20, 2026

(54) MAGNETIC HEAD HAVING MAGNETIC LAYERS OF VARYING THICKNESS AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki Kanagawa (JP); Masayuki Takagishi, Tokyo (JP); Naoyuki Narita, Funabashi Chiba (JP); Tomoyuki Maeda, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/981,321

(22) Filed: Dec. 13, 2024

(65) Prior Publication Data

US 2025/0232788 A1 Jul. 17, 2025

(30) Foreign Application Priority Data

Jan. 11, 2024 (JP) ................................ 2024-002759

(51) Int. Cl.
*G11B 5/147* (2006.01)
*G11B 5/02* (2006.01)

(52) U.S. Cl.
CPC ................ *G11B 5/147* (2013.01); *G11B 5/02* (2013.01); *G11B 2220/2516* (2013.01)

(58) Field of Classification Search
None
See application file for complete search history.

(56) References Cited

U.S. PATENT DOCUMENTS 9,064,508 B1 6/2015 Shiimoto et al.
10,121,497 B1 * 11/2018 Takahashi .............. G11B 5/235
(Continued)

FOREIGN PATENT DOCUMENTS

JP 2008-277586 A 11/2008
JP 2022-012263 A 1/2022
(Continued)

OTHER PUBLICATIONS

Nakagawa et al., "Spin-torque oscillator with coupled out-of-plane oscillation layers for microwave-assisted magnetic recording: Experimental, analytical, and numerical studies", Applied Physics Letters, vol. 122, No. 042403, 2023, 6 pages.

*Primary Examiner* — William J Klimowicz
(74) *Attorney, Agent, or Firm* — Knobbe, Martens, Olson & Bear, LLP

(57) ABSTRACT

According to one embodiment, a magnetic head includes a first magnetic pole, a second magnetic pole, and a magnetic element. The magnetic element is provided between the first magnetic pole and the second magnetic pole in a first direction from the first magnetic pole to the second magnetic pole. The magnetic element includes a first magnetic layer provided between the first magnetic pole and the second magnetic pole, a second magnetic layer provided between the first magnetic layer and the second magnetic pole, a third magnetic layer provided between the second magnetic layer and the second magnetic pole, and a fourth magnetic layer provided between the third magnetic layer and the second magnetic pole. The first magnetic layer includes a first face facing the first magnetic pole. The fourth magnetic layer includes a second face facing the second magnetic pole.

11 Claims, 13 Drawing Sheets

(56) References Cited

U.S. PATENT DOCUMENTS

| | | | | |
|---|---|---|---|---|
| 11,881,234 | B2 * | 1/2024 | Nakagawa | G11B 5/3116 |
| 12,068,004 | B2 * | 8/2024 | Nakagawa | G11B 20/24 |
| 12,165,677 | B2 * | 12/2024 | Nakagawa | G11B 5/1278 |
| 2008/0268291 | A1 | 10/2008 | Akiyama et al. | |
| 2011/0205655 | A1 * | 8/2011 | Shimizu | G11B 5/02 360/246.2 |
| 2012/0262821 | A1 * | 10/2012 | Taguchi | G11B 5/235 360/99.08 |
| 2014/0211340 | A1 * | 7/2014 | Sugiura | G11B 5/3133 360/97.11 |
| 2017/0236537 | A1 * | 8/2017 | Murakami | G11B 5/315 360/125.3 |
| 2018/0268848 | A1 * | 9/2018 | Narita | G11B 5/33 |
| 2021/0375308 | A1 * | 12/2021 | Nagasawa | G11B 5/235 |
| 2021/0375309 | A1 * | 12/2021 | Iwasaki | G11B 5/1278 |
| 2022/0005497 | A1 * | 1/2022 | Takagishi | G11B 5/1278 |
| 2022/0068299 | A1 * | 3/2022 | Iwasaki | G11B 5/3116 |
| 2022/0270641 | A1 * | 8/2022 | Nakagawa | G11B 5/23 |
| 2023/0045730 | A1 * | 2/2023 | Nakagawa | G11B 5/02 |
| 2023/0178102 | A1 * | 6/2023 | Nakagawa | G11B 5/3163 428/810 |
| 2023/0386510 | A1 * | 11/2023 | Nakagawa | G11B 5/314 |
| 2024/0046959 | A1 | 2/2024 | Nakagawa et al. | |
| 2024/0296864 | A1 | 9/2024 | Nakagawa et al. | |
| 2024/0296865 | A1 | 9/2024 | Nakagawa et al. | |

FOREIGN PATENT DOCUMENTS

| | | | |
|---|---|---|---|
| JP | 2022-129730 | A | 9/2022 |
| JP | 2023-083663 | A | 6/2023 |
| JP | 2024-022848 | A | 2/2024 |
| JP | 2024-123725 | A | 9/2024 |
| JP | 2024-123729 | A | 9/2024 |

* cited by examiner

MAGNETIC HEAD HAVING MAGNETIC LAYERS OF VARYING THICKNESS AND MAGNETIC RECORDING DEVICE

CROSS-REFERENCE TO RELATED APPLICATIONS

This application is based upon and claims the benefit of priority from Japanese Patent Application No. 2024-002759, filed on Jan. 11, 2024; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the characteristics of magnetic heads.

DETAILED DESCRIPTION

Figure 1:
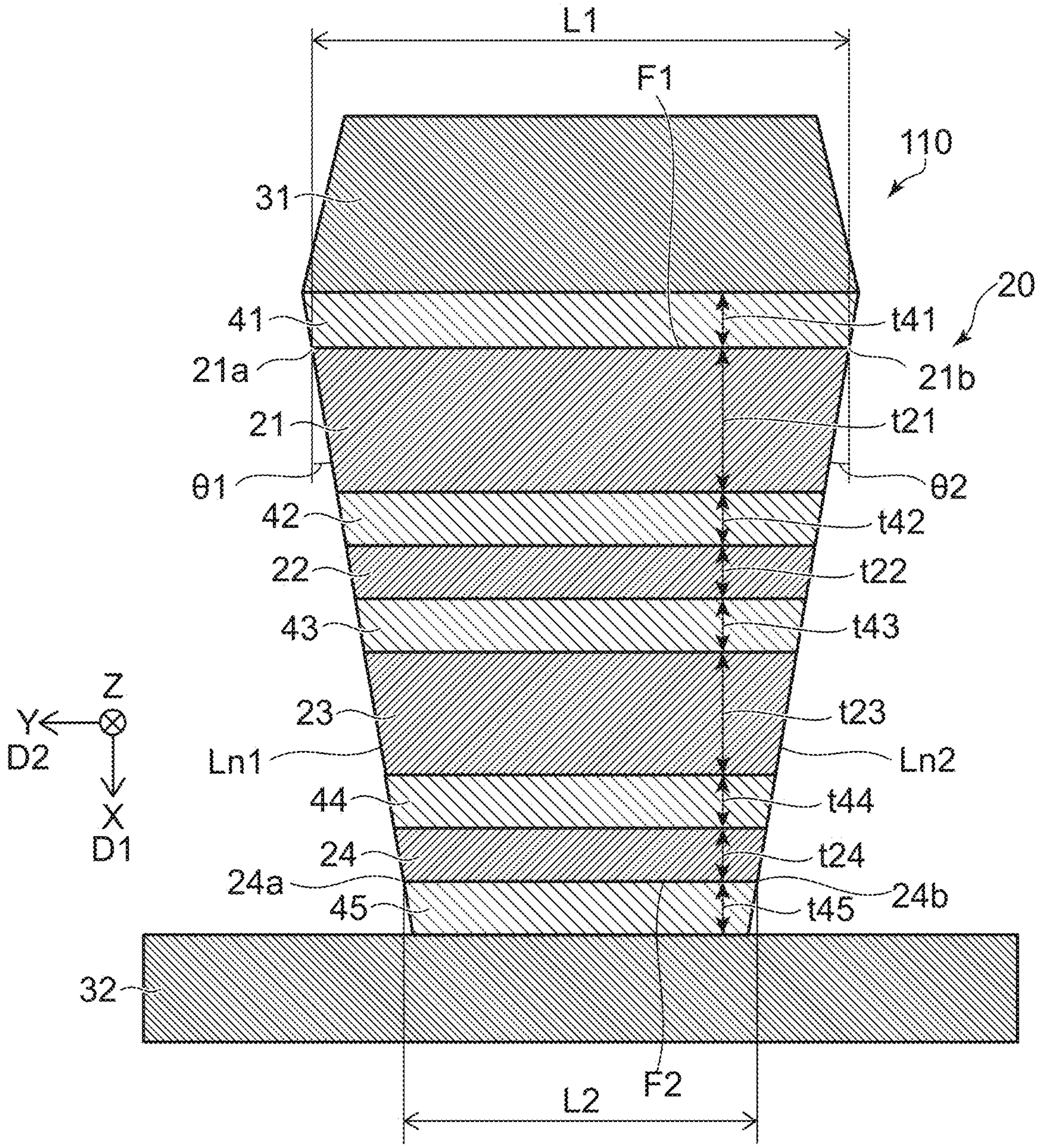
FIG. 1 is a schematic plan view illustrating a magnetic head according to a first embodiment.

According to one embodiment, a magnetic head includes a first magnetic pole, a second magnetic pole, and a magnetic element. The magnetic element is provided between the first magnetic pole and the second magnetic pole in a first direction from the first magnetic pole to the second magnetic pole. The magnetic element includes a first magnetic layer provided between the first magnetic pole and the second magnetic pole, a second magnetic layer provided between the first magnetic layer and the second magnetic pole, a third magnetic layer provided between the second magnetic layer and the second magnetic pole, and a fourth magnetic layer provided between the third magnetic layer and the second magnetic pole. The first magnetic layer includes a first face facing the first magnetic pole. The fourth magnetic layer includes a second face facing the second magnetic pole. A first area of the first face is larger than a second area of the second face.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a magnetic head according to a first embodiment.

Figure 2:
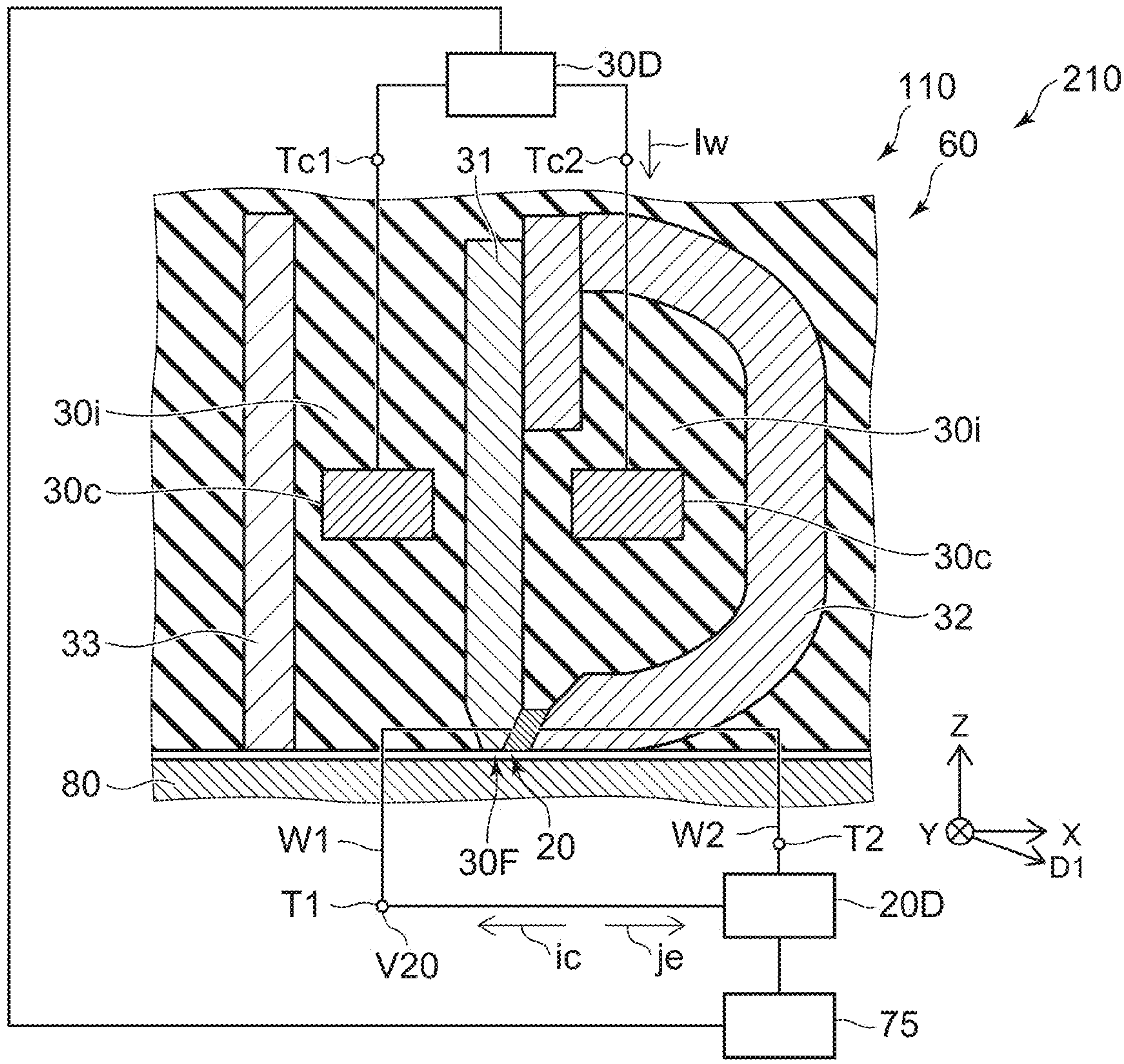
FIG. 2 is a schematic cross-sectional view illustrating a magnetic recording device including the magnetic head according to the first embodiment.

FIG. 2 is a schematic cross-sectional view illustrating a magnetic recording device including the magnetic head according to the first embodiment.

As shown in FIG. 2, a magnetic recording device 210 according to the embodiment includes a magnetic head 110 and a magnetic recording medium 80. The magnetic recording device 210 may further include a controller 75 (for example, control circuitry). In the magnetic recording device 210, at least a recording operation is performed. In the recording operation, information is recorded on the magnetic recording medium 80 using the magnetic head 110.

The magnetic head 110 includes a recording section 60. As described later, the magnetic head 110 may include a reproducing section. The recording section 60 includes a first magnetic pole 31, a second magnetic pole 32, and a magnetic element 20. The recording section 60 may further include a coil 30*c*. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a main magnetic pole. The second magnetic pole 32 is, for example, a trailing shield. The first magnetic pole 31 may be a trailing shield, and the second magnetic pole 32 may be a main magnetic pole.

A direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 110 move relative to each other along the down-track direction. A recording magnetic field generated from the magnetic head 110 is applied to a desired position on the magnetic recording medium 80. The magnetization at a desired position of the magnetic recording medium 80 is controlled in a direction according to the recording magnetic field. As a result, information is recorded on the magnetic recording medium 80.

A direction from the first magnetic pole 31 to the second magnetic pole 32 is defined as a first direction D1. The first direction D1 substantially extends along the X-axis direction. In the embodiment, the first direction D1 may be inclined with respect to the X-axis direction. The angle of inclination is, for example, more than 0 degrees and not more than 10 degrees.

In this example, a part of the coil 30*c* is between the first magnetic pole 31 and the second magnetic pole 32. In this example, a shield 33 is provided. The first magnetic pole 31 is located between the shield 33 and the second magnetic pole 32 in the X-axis direction. Another part of the coil 30*c* is between the shield 33 and the first magnetic pole 31. An insulating section 30*i* is provided between these multiple elements. The shield 33 is, for example, a leading shield. The magnetic head 110 may include side shields (not shown).

As shown in FIG. 2, a recording current Iw is supplied from a recording circuit 30D to the coil 30*c*. For example, a first coil terminal Tc1 and a second coil terminal Tc2 are provided on the coil 30*c*. The recording current Iw is supplied to the coil 30*c* via these coil terminals. A recording magnetic field corresponding to the recording current Iw is applied to the magnetic recording medium 80 from the first magnetic pole 31.

As shown in FIG. 2, the first magnetic pole 31 includes a medium facing face 30F. The medium facing face 30F is, for example, an ABS (Air Bearing Surface). The medium facing face 30F faces the magnetic recording medium 80, for example. For example, the medium facing face 30F is along the X-Y plane.

As shown in FIG. 2, an element circuit 20D is electrically connected to the magnetic element 20. In this example, the magnetic element 20 is electrically connected to the first magnetic pole 31 and the second magnetic pole 32. The magnetic head 110 is provided with a first terminal T1 and a second terminal T2. The first terminal T1 is electrically connected to one end of the magnetic element 20 via the first wiring W1 and the first magnetic pole 31. The second terminal T2 is electrically connected to the other end of the magnetic element 20 via the second wiring W2 and the second magnetic pole 32. For example, an element current ic is supplied to the magnetic element 20 from the element circuit 20D.

As shown in FIG. 2, in an operating state, the element current ic has a direction from the first magnetic pole 31 to the second magnetic pole 32. In this case, electrons flow je accompanying the element current ic has a direction from the second magnetic pole 32 to the first magnetic pole 31. The element current ic is, for example, a direct current. As will be described later, in another operating state, the element current ic has a direction from the second magnetic pole 32 to the first magnetic pole 31. In this case, the electron flow je has a direction from the first magnetic pole 31 to the second magnetic pole 32.

For example, when the element current ic equal to or higher than a threshold value flows through the magnetic element 20, oscillation occurs in the magnetic layer included in the magnetic element 20. The magnetic element 20 functions as, for example, an STO (Spin-Torque Oscillator). Along with the oscillation, an alternating magnetic field (for example, a high frequency magnetic field) is generated from the magnetic element 20. The alternating magnetic field generated by the magnetic element 20 is applied to the magnetic recording medium 80 to assist recording on the magnetic recording medium 80. For example, MAMR (Microwave Assisted Magnetic Recording) can be implemented.

The controller 75 controls the recording circuit 30D and the element circuit 20D.

As shown in FIG. 1, the magnetic element 20 includes a first magnetic layer 21, a second magnetic layer 22, a third magnetic layer 23, and a fourth magnetic layer 24. The first magnetic layer 21 is provided between the first magnetic pole 31 and the second magnetic pole 32. The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32.

The magnetic element 20 may include a first nonmagnetic layer 41, a second nonmagnetic layer 42, a third nonmagnetic layer 43, a fourth nonmagnetic layer 44, and a fifth nonmagnetic layer 45. The first nonmagnetic layer 41 is provided between the first magnetic pole 31 and the first magnetic layer 21. The second nonmagnetic layer 42 is provided between the first magnetic layer 21 and the second magnetic layer 22. The third nonmagnetic layer 43 is provided between the second magnetic layer 22 and the third magnetic layer 23. The fourth nonmagnetic layer 44 is provided between the third magnetic layer 23 and the fourth magnetic layer 24. The fifth nonmagnetic layer 45 is provided between the fourth magnetic layer 24 and the second magnetic pole 32.

As shown in FIG. 1, the first magnetic layer 21 includes a first face F1 facing the first magnetic pole 31. The fourth magnetic layer 24 includes a second face F2 facing the second magnetic pole 32. In the embodiment, the first area of the first face F1 is larger than the second area of the second face F2.

For example, the side face of the magnetic element 20 is inclined with respect to the first direction D1. As shown in FIG. 2, the first magnetic pole 31 includes the medium facing face 30F. As shown in FIG. 1, a first length L1 of the first face F1 along a second direction D2 is longer than a second length L2 of the second face F2 along the second direction D2. The second direction D2 is along the medium facing face 30F and is perpendicular to the first direction D1. The second direction D2 is, for example, the Y-axis direction. By such a difference in length, the above-mentioned difference in area may occur.

As will be described later, by such a difference in area (or difference in length), high-speed reversal of magnetization in the magnetic element 20 can be obtained. High-speed writing operations can be performed. According to the embodiment, a magnetic head with improved characteristics can be provided. For example, high recording density can be obtained.

As shown in FIG. 1, the first face F1 includes a first end 21*a* and a first other end 21*b*. A direction from the first other end 21*b* to the first end 21*a* is along the second direction D2. The second face F2 includes a second end 24*a* and a second other end 24*b*. A direction from the second other end 24*b* to the second end 24*a* is along the second direction D2. A distance between the first end 21*a* and the second end 24*a* is shorter than a distance between the first end 21*a* and the second other end 24*b*. The first end 21*a* and the second end 24*a* are ends on the same side in the second direction D2. The first other end 21*b* and the second other end 24*b* are ends on the same side in the second direction D2.

A straight line passing through the first end 21*a* and the second end 24*a* is defined as a first straight line Ln1. The first straight line Ln1 is inclined with respect to a direction (first direction D1) perpendicular to the first face F1. An angle between the first straight line Ln1 and a direction (first direction D1) perpendicular to the first face F1 is defined as a first angle θ1. The first angle θ1 is greater than zero.

A straight line passing through the first other end 21*b* and the second other end 24*b* is defined as a second straight line Ln2. The second straight line Ln2 is inclined with respect to the direction (first direction D1) perpendicular to the first face F1. An angle between the second straight line Ln2 and the direction (first direction D1) perpendicular to the second face F2 is defined as a second angle θ2. The second angle θ2 is greater than zero.

The above-mentioned difference in area and the above-mentioned difference in length may occur due to the first angle θ1 and the second angle θ2. The second angle θ2 may be substantially the same as the first angle θ1. In the embodiment, the first angle θ1 may be, for example, not less than 5 degrees and not more than 15 degrees. The second angle θ2 may be, for example, not less than 5 degrees and not more than 15 degrees.

An example of the operation of the magnetic head 110 will be described below.

FIGS. 3A to 3D are schematic plan views illustrating the operating state of the magnetic head according to the first embodiment.

In the magnetic head 110, a first operation OP1 and a second operation OP2 are performed. In the first operation OP1, the element current ic flows from the first magnetic pole 31 to the second magnetic pole 32. In the second operation OP2, the element current ic flows from the second magnetic pole 32 to the first magnetic pole 31. In both the first operation OP1 and the second operation OP2, the magnetization of the magnetic element 20 oscillates.

On the other hand, a gap magnetic field Hg is generated between the first magnetic pole 31 and the second magnetic pole 32 due to the recording magnetic field based on the recording current Iw supplied to the coil 30*c*. The direction of the recording current Iw changes depending on the information to be recorded. This changes the direction of the gap magnetic field Hg.

Figure 3A:
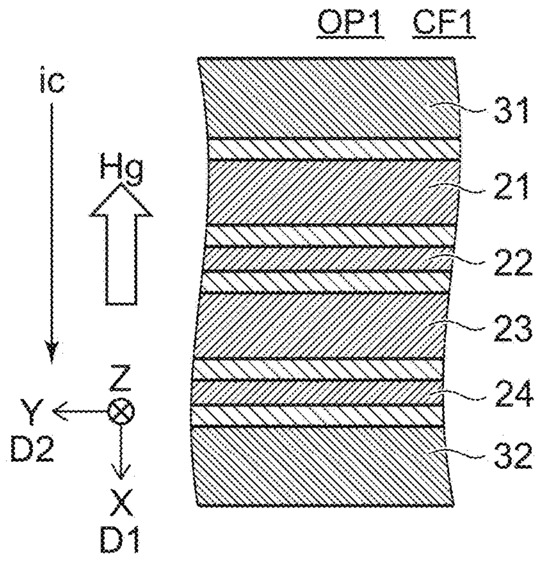
FIGS. 3A to 3D are schematic plan views illustrating the operating state of the magnetic head according to the first embodiment.
Figure 3B:
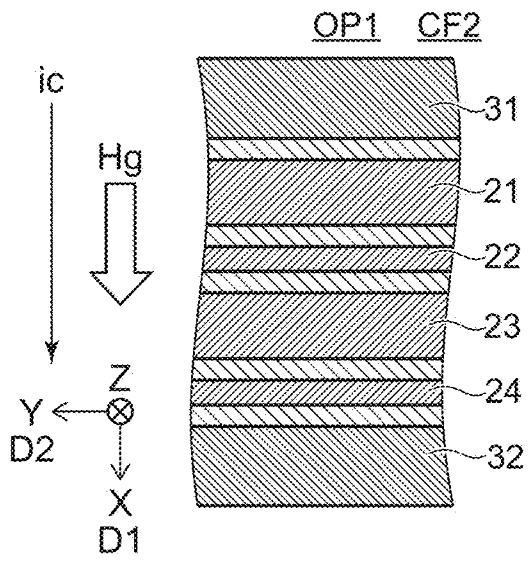
Figure 3C:
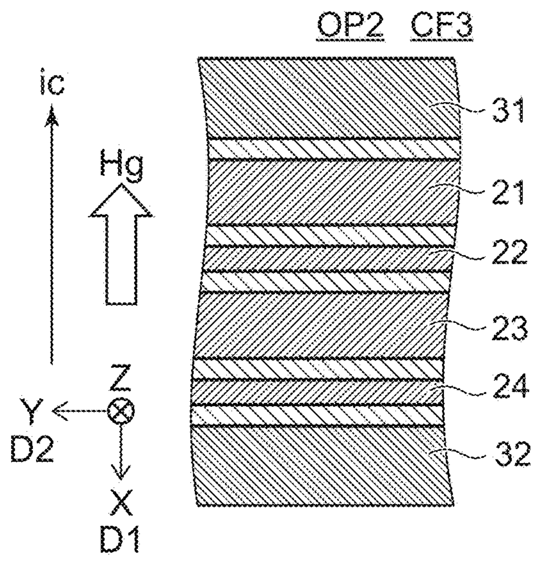
Figure 3D:
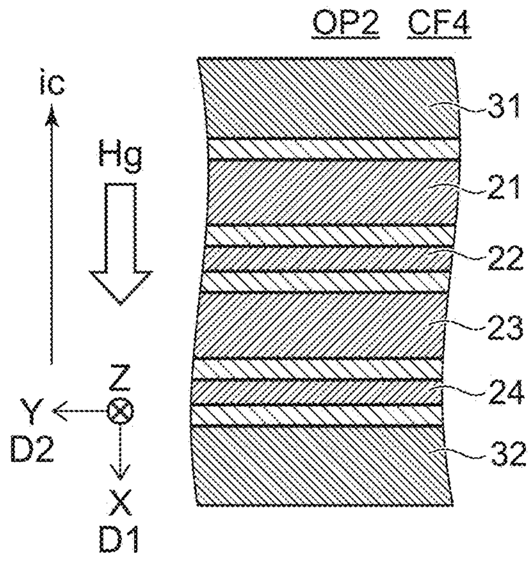

In a first configuration CF1 shown in FIG. 3A, the gap magnetic field Hg has a direction from the second magnetic pole 32 to the first magnetic pole 31 in the first operation OP1. In a second configuration CF2 shown in FIG. 3B, the gap magnetic field Hg has a direction from the first magnetic pole 31 to the second magnetic pole 32 in the first operation OP1. In a third configuration CF3 shown in FIG. 3C, the gap magnetic field Hg has a direction from the second magnetic pole 32 to the first magnetic pole 31 in the second operation OP2. In the fourth configuration CF4 shown in FIG. 3D, the gap magnetic field Hg has a direction from the first magnetic pole 31 to the second magnetic pole 32 in the second operation OP2.

In the first operation OP1, a transition occurs between the first configuration CF1 and the second configuration CF2. In the second operation OP2, a transition occurs between the third configuration CF3 and the fourth configuration CF4. It is desirable that these transitions occur in a short period of time.

Figure 4:
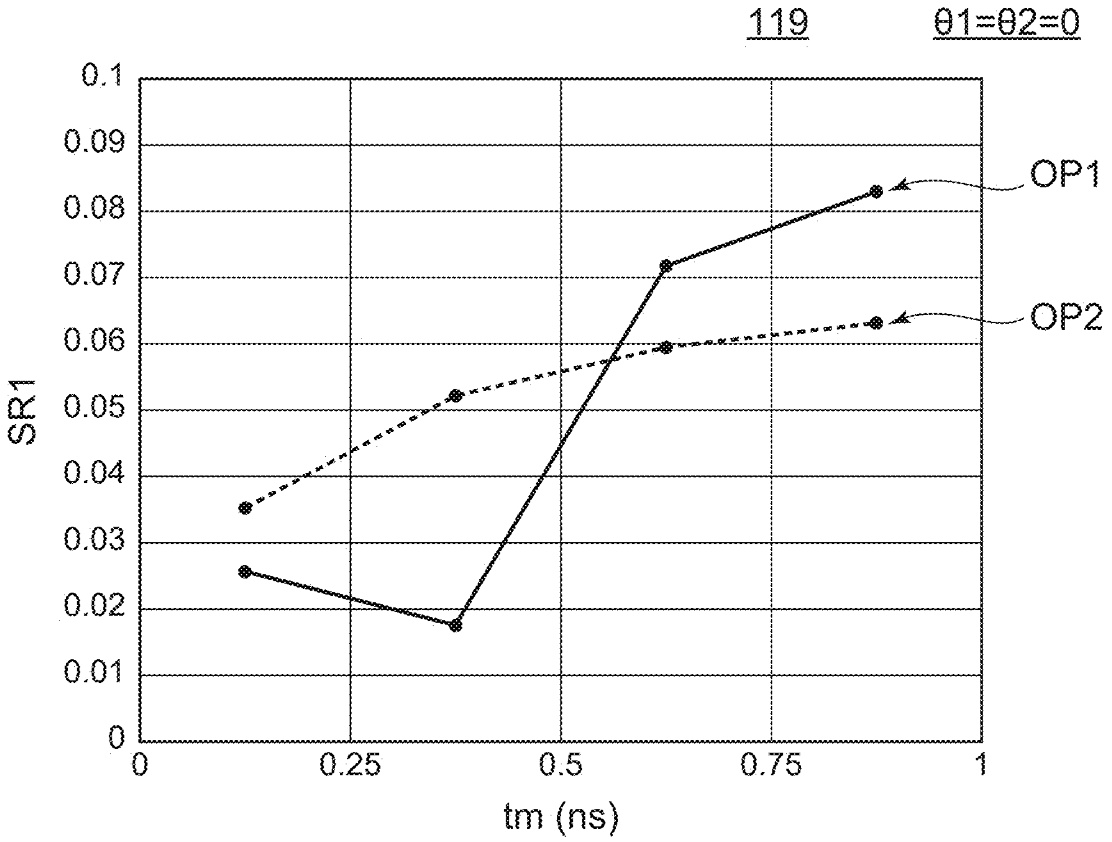
FIG. 4 is a graph illustrating the characteristics of the magnetic head of a reference example.

FIG. 4 is a graph illustrating the characteristics of the magnetic head of the reference example.

FIG. 4 illustrates simulation results of the characteristics of a magnetic head 119 of the reference example. In the magnetic head 119, the first angle θ1 and the second angle θ2 are 0, and the first area of the first face F1 is the same as the second area of the second face F2. The horizontal axis in FIG. 4 is time tm. The vertical axis is the oscillation strength SR1 (relative value) of the magnetic layer.

In the first operation OP1, when time tm is 0, switching from the first configuration CF1 to the second configuration CF2 or from the second configuration CF2 to the first configuration CF1 is performed. In the second operation OP2, when time tm is 0, switching from the third configuration CF3 to the fourth configuration CF4 or from the fourth configuration CF4 to the third configuration CF3 is performed.

As shown in FIG. 4, in the first operation OP1 and the second operation OP2, when the time tm is about 0.2 ns, the oscillation strength SR1 is low. A high oscillation strength SR1 is obtained when the time tm is 0.6 ns or more. In this example, the switching time is, for example, about 0.6 ns.

In the time range in which the time tm is not less than 0 ns and not more than 0.5 ns, the oscillation strength SR1 is low in the first operation OP1. On the other hand, in this time range, a higher oscillation strength SR1 is obtained in the second operation OP2 than in the first operation OP1. In the time range in which the time tm is 0.6 ns or more, the oscillation strength SR1 in the first operation OP1 is higher than the oscillation strength SR1 in the second operation OP2.

Thus, in the second operation OP2, although a relatively high oscillation strength SR1 is obtained at the beginning of switching, the oscillation strength SR1 is relatively low after a long time after switching. On the other hand, in the first operation OP1, although the oscillation strength SR1 is relatively low at the beginning of switching, a high oscillation strength SR1 is obtained after a long period of time after switching.

Hereinafter, an example of simulation results regarding the oscillation strength SR1 when the first angle θ1 is changed will be described. In the example below, the second angle θ2 is the same as the first angle θ1.

Figure 5:
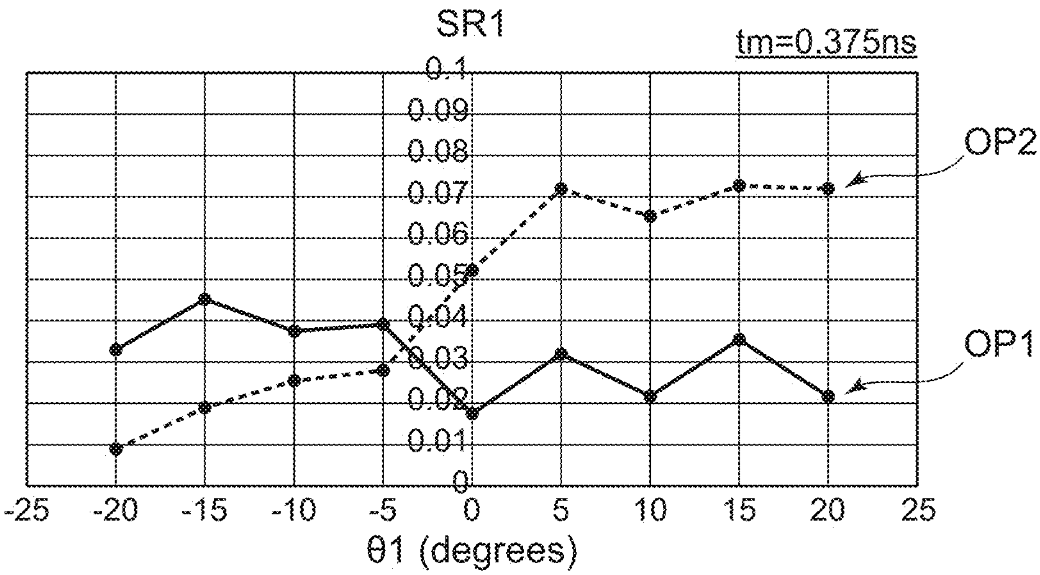
FIG. 5 is a graph illustrating the characteristics of the magnetic head.
Figure 6:
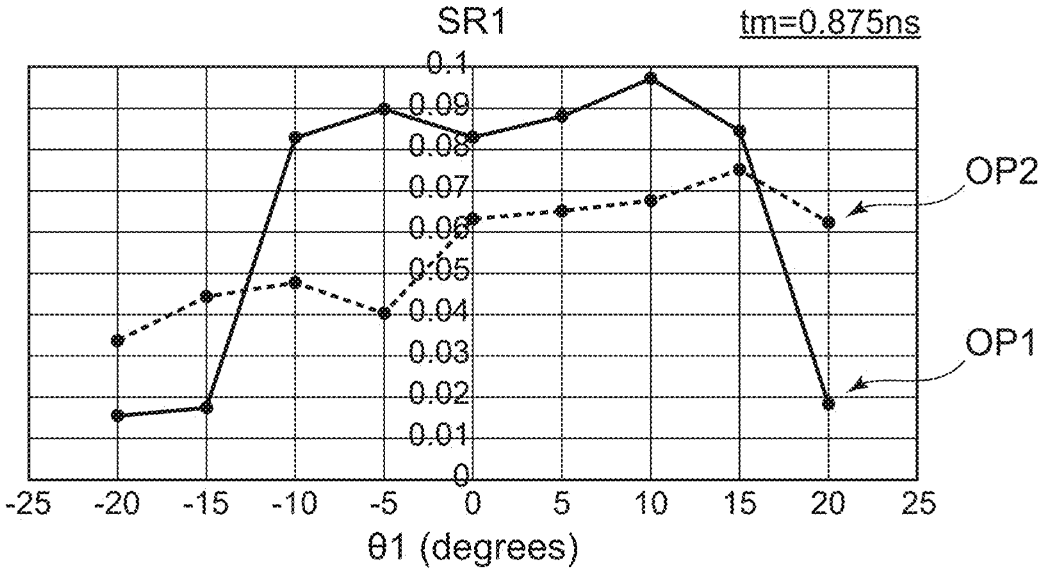
FIG. 6 is a graph illustrating the characteristics of the magnetic head.

FIGS. 5 and 6 are graphs illustrating the characteristics of the magnetic head.

The horizontal axis of these figures is the first angle θ1. When the first angle θ1 is positive, the first area of the first face F1 is larger than the second area of the second face F2. When the first angle θ1 is negative, the side faces of the magnetic element 20 exhibit an opposite slope, and the first area of the first face F1 is smaller than the second area of the second face F2. In FIG. 5, time tm is 0.375 ns. In FIG. 6, time tm is 0.875 ns.

As shown in FIG. 5, as the first angle θ1 becomes larger than 0 degrees, the oscillation strength SR1 in the second operation OP2 increases. On the other hand, the oscillation strength SR1 in the first operation OP1 does not change significantly with respect to a change in the first angle θ1. When the first angle θ1 is larger than 5 degrees, a high oscillation strength SR1 can be effectively obtained in the second operation OP2. It is preferable that the first angle θ1 is, for example, 5 degrees or more.

As shown in FIG. 6, in this example, as the first angle θ1 becomes larger than 0 degrees, the oscillation strength SR1 in the second operation OP2 increases. On the other hand, the oscillation strength SR1 in the first operation OP1 decreases when the first angle θ1 exceeds 15 degrees. In the embodiment, the first angle θ1 is preferably 15 degrees or less.

When the first angle θ1 is not less than 5 degrees and not more than 15 degrees, high oscillation strength SR1 is obtained in the first operation OP1 and the second operation OP2.

The reason why the oscillation strength SR1 increases in the second operation OP2 at the time tm of 0.375 ns when the first angle θ1 is larger than 0 is considered to be that the current density in the plurality of magnetic layers included in the magnetic element 20 is appropriately controlled.

For example, when the first angle θ1 becomes larger than 0, the current density in the third magnetic layer 23 becomes higher than the current density in the first magnetic layer 21. As a result, for example, the magnetization of the third magnetic layer 23 tends to oscillate quickly after switching. For example, when the current density in the first magnetic layer 21 is low, the magnetization of the first magnetic layer 21 becomes difficult to move, and inhibition of oscillation of the third magnetic layer 23 is suppressed. For example, the oscillation strength SR1 in the second operation OP2 is largely contributed by the oscillation of the magnetization of the third magnetic layer 23.

Hereinafter, some examples regarding the configuration of the magnetic element 20 will be described.

FIGS. 7 to 10 are schematic plan views illustrating magnetic heads according to the first embodiment.

Figure 7:
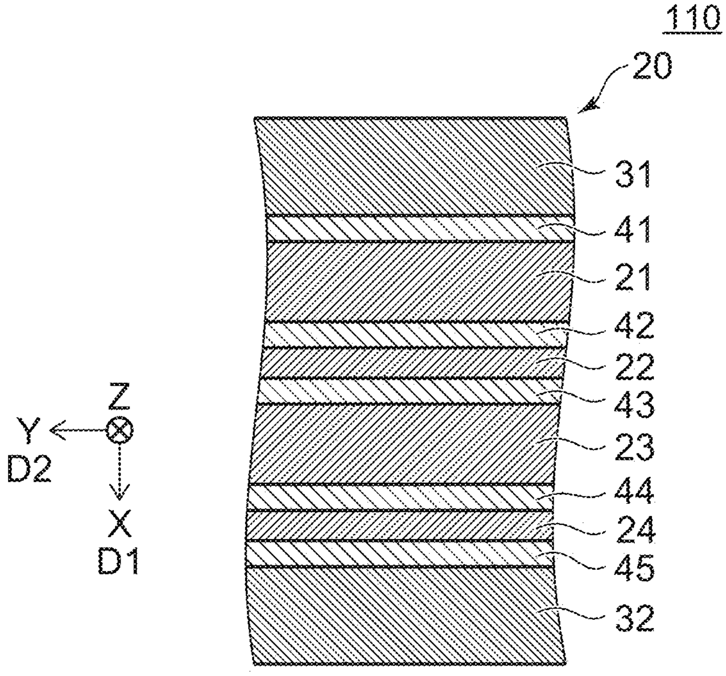
FIG. 7 is a schematic plan view illustrating a magnetic head according to the first embodiment.

As shown in FIG. 7, in the magnetic head 110 according to the embodiment, the magnetic element 20 includes a first nonmagnetic layer 41, a second nonmagnetic layer 42, a third nonmagnetic layer 43, a fourth nonmagnetic layer 44, and a fifth nonmagnetic layer 45.

In the magnetic head 110, the first nonmagnetic layer 41 includes at least one selected from the group consisting of Cu, Au, Cr, V, Al, and Ag. The second nonmagnetic layer 42 includes at least one selected from the group consisting of Ru, Ir, Ta, Rh, Pd, Pt, and W. The third nonmagnetic layer 43 includes at least one selected from the group consisting of Cu, Au, Cr, V, Al, and Ag. The fourth nonmagnetic layer 44 includes at least one selected from the group consisting of Cu, Au, Cr, V, Al, and Ag. The fifth nonmagnetic layer 45 includes at least one selected from the group consisting of Ru, Ir, Ta, Rh, Pd, Pt, and W.

As shown in FIG. 1, a thickness of the first magnetic layer 21 along the first direction D1 is defined as a first thickness t21. A thickness of the second magnetic layer 22 along the first direction D1 is defined as a second thickness t22. A thickness of the third magnetic layer 23 along the first direction D1 is defined as a third thickness t23. A thickness of the fourth magnetic layer 24 along the first direction D1 is defined as a fourth thickness t24.

In the magnetic head 110, the first thickness t21 is thicker than the second thickness t22. The third thickness t23 is thicker than the fourth thickness t24. The first thickness t21 is, for example, not less than 3 nm and not more than 15 nm. The first thickness t21 may be, for example, not less than 5 nm and not more than 15 nm. The second thickness t22 is, for example, not less than 1 nm and not more than 8 nm. The second thickness t22 may be, for example, not less than 1 nm and not more than 4 nm. The third thickness t23 is, for example, not less than 3 nm and not more than 15 nm. The third thickness t23 may be, for example, not less than 5 nm and not more than 15 nm. The fourth thickness t24 is, for example, not less than 1 nm and not more than 8 nm. The fourth thickness t24 may be, for example, not less than 1 nm and not more than 4 nm.

Figure 8:
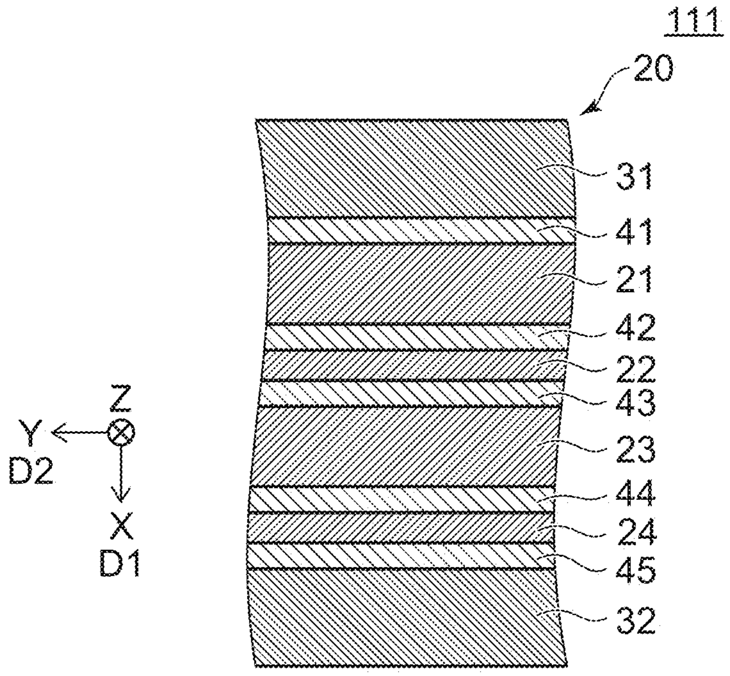
FIG. 8 is a schematic plan view illustrating a magnetic head according to the first embodiment.

In a magnetic head 111 according to the embodiment illustrated in FIG. 8, the first nonmagnetic layer 41 includes at least one selected from the group consisting of Cu, Au, Cr, V, Al, and Ag. The second nonmagnetic layer 42 includes at least one selected from the group consisting of Cu, Au, Cr, V, Al, and Ag. The third nonmagnetic layer 43 includes at least one selected from the group consisting of Ru, Ir, Ta, Rh, Pd, Pt, and W. The fourth nonmagnetic layer 44 includes at least one selected from the group consisting of Cu, Au, Cr, V, Al, and Ag. The fifth nonmagnetic layer 45 includes at least one selected from the group consisting of Ru, Ir, Ta, Rh, Pd, Pt, and W.

In the magnetic head 111, the first thickness t21 is thicker than the second thickness t22. The third thickness t23 is thicker than the fourth thickness t24. The first thickness t21 is, for example, not less than 3 nm and not more than 15 nm. The first thickness t21 may be, for example, not less than 5 nm and not more than 15 nm. The second thickness t22 is, for example, not less than 1 nm and not more than 8 nm. The second thickness t22 may be, for example, not less than 1 nm and not more than 4 nm. The third thickness t23 is, for example, not less than 3 nm and not more than 15 nm. The third thickness t23 may be, for example, not less than 5 nm and not more than 15 nm. The fourth thickness t24 is, for example, not less than 1 nm and not more than 8 nm. The fourth thickness t24 may be, for example, not less than 1 nm and not more than 4 nm.

Figure 9:
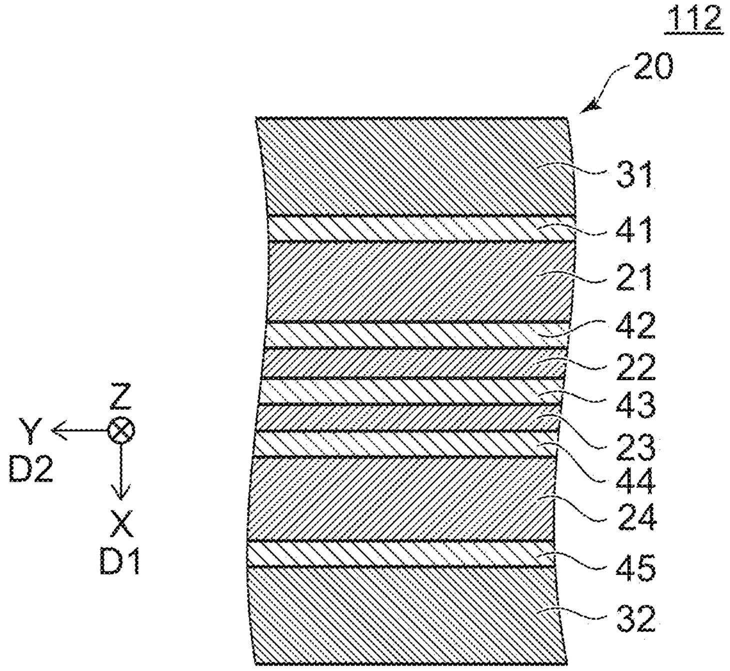
FIG. 9 is a schematic plan view illustrating a magnetic head according to the first embodiment.

In a magnetic head 112 according to the embodiment illustrated in FIG. 9, the first nonmagnetic layer 41 includes at least one selected from the group consisting of Cu, Au, Cr, V, Al, and Ag. The second nonmagnetic layer 42 includes at least one selected from the group consisting of Cu, Au, Cr, V, Al, and Ag. The third nonmagnetic layer 43 includes at least one selected from the group consisting of Ru, Ir, Ta, Rh, Pd, Pt, and W. The fourth nonmagnetic layer 44 includes at least one selected from the group consisting of Cu, Au, Cr, V, Al, and Ag. The fifth nonmagnetic layer 45 includes at least one selected from the group consisting of Ru, Ir, Ta, Rh, Pd, Pt, and W.

In the magnetic head 112, the first thickness t21 is thicker than the second thickness t22. The third thickness t23 is thinner than the fourth thickness t24. The first thickness t21 is, for example, not less than 3 nm and not more than 15 nm. The first thickness t21 may be, for example, not less than 5 nm and not more than 15 nm. The second thickness t22 is, for example, not less than 1 nm and not more than 8 nm. The second thickness t22 may be, for example, not less than 1 nm and not more than 4 nm. The third thickness t23 is, for example, not less than 1 nm and not more than 8 nm. The third thickness t23 may be, for example, not less than 1 nm and not more than 4 nm. The fourth thickness t24 is, for example, not less than 3 nm and not more than 15 nm. The fourth thickness t24 may be, for example, not less than 5 nm and not more than 15 nm.

In the magnetic head 110, the magnetic head 111, and the magnetic head 112, the first nonmagnetic layer 41 is in contact with the first magnetic pole 31 and the first magnetic layer 21. The second nonmagnetic layer 42 is in contact with the first magnetic layer 21 and the second magnetic layer 22. The third nonmagnetic layer 43 is in contact with the second magnetic layer 22 and the third magnetic layer 23. The fourth nonmagnetic layer 44 is in contact with the third magnetic layer 23 and the fourth magnetic layer 24. The fifth nonmagnetic layer 45 is in contact with the fourth magnetic layer 24 and the second magnetic pole 32.

Figure 10:
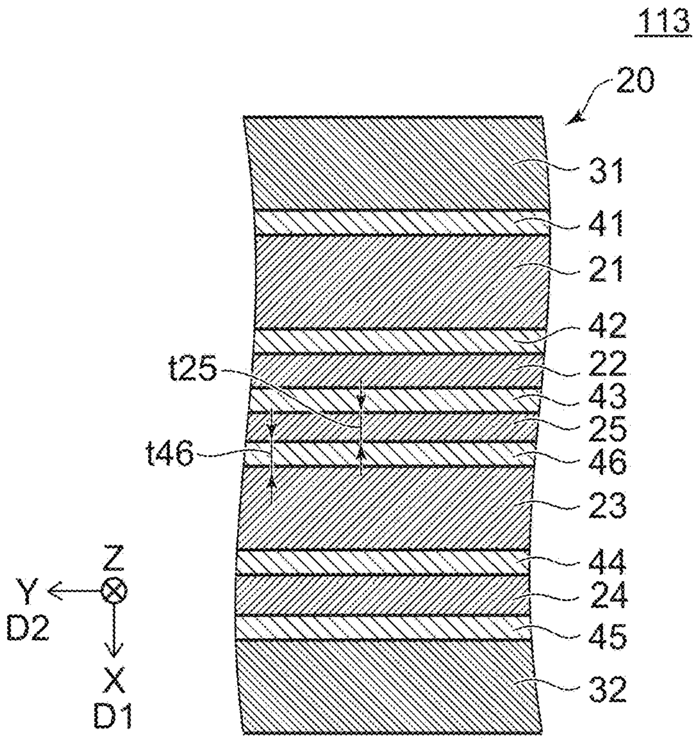
FIG. 10 is a schematic plan view illustrating a magnetic head according to the first embodiment.

In a magnetic head 113 according to the embodiment illustrated in FIG. 10, the magnetic element 20 further includes a fifth magnetic layer 25 and a sixth nonmagnetic layer 46. The configuration of the magnetic head 113 other than this may be the same as the configuration of the magnetic head 110, for example.

In the magnetic head 113, the fifth magnetic layer 25 is provided between the third nonmagnetic layer 43 and the third magnetic layer 23. The sixth nonmagnetic layer 46 is provided between the fifth magnetic layer 25 and the third magnetic layer 23.

In the magnetic head 113, the first nonmagnetic layer 41 includes at least one selected from the group consisting of Cu, Au, Cr, V, Al, and Ag. The second nonmagnetic layer 42 includes at least one selected from the group consisting of Cu, Au, Cr, V, Al, and Ag. The third nonmagnetic layer 43 includes at least one selected from the group consisting of Ru, Ir, Ta, Rh, Pd, Pt, and W. The fourth nonmagnetic layer 44 includes at least one selected from the group consisting of Cu, Au, Cr, V, Al, and Ag. The fifth nonmagnetic layer 45 includes at least one selected from the group consisting of Ru, Ir, Ta, Rh, Pd, Pt, and W. The sixth nonmagnetic layer 46 includes at least one selected from the group consisting of Cu, Au, Cr, V, Al, and Ag.

As shown in FIG. 10, in the magnetic head 113, a thickness of the fifth magnetic layer 25 along the first direction D1 is defined as a fifth thickness t25. As shown in FIG. 1, the first thickness t21, the second thickness t22, the third thickness t23, and the fourth thickness t24 are defined. In the magnetic head 113, the first thickness t21 is thicker than the second thickness t22. The third thickness t23 is thicker than the fourth thickness t24. The fifth thickness t25 is thinner than the third thickness t23. The first thickness t21 is, for example, not less than 3 nm and not more than 15 nm. The first thickness t21 may be, for example, not less than 5 nm and not more than 15 nm. The second thickness t22 is, for example, not less than 1 nm and not more than 8 nm. The second thickness t22 may be, for example, not less than 1 nm and not more than 4 nm. The third thickness t23 is, for example, not less than 3 nm and not more than 15 nm. The third thickness t23 may be, for example, not less than 5 nm and not more than 15 nm. The fourth thickness t24 is, for example, not less than 1 nm and note more than 8 nm. The fourth thickness t24 may be, for example, not less than 1 nm and not more than 4 nm. The fifth thickness t25 is, for example, not less than 1 nm and not more than 8 nm. The fifth thickness t25 may be, for example, not less than 1 nm and not more than 4 nm.

The configuration described regarding the magnetic head 110 may be applied to the magnetic head 111, the magnetic head 112, and the magnetic head 113. For example, the first area of the first face F1 is larger than the second area of the second face F2. For example, the first length L1 is longer than the second length L2. The first angle θ1 is not less than 5 degrees and not more than 15 degrees. The second angle θ2 is not less than 5 degrees and not more than 15 degrees.

In the magnetic heads 110 to 113, the thickness t41 (see FIG. 1) of the first nonmagnetic layer 41 is, for example, not less than 0.5 nm and not more than 6 nm. The thickness t42 (see FIG. 1) of the second nonmagnetic layer 42 is, for example, not less than 0.5 nm and not more than 10 nm. The thickness t43 (see FIG. 1) of the third nonmagnetic layer 43 is, for example, not less than 0.5 nm and not more than 10 nm. The thickness t44 (see FIG. 1) of the fourth nonmagnetic layer 44 is, for example, not less than 0.5 nm and not more than 6 nm. The thickness t45 (see FIG. 1) of the fifth nonmagnetic layer 45 is, for example, not less than 1 nm and not more than 10 nm. The thickness t46 (see FIG. 10) of the sixth nonmagnetic layer 46 is, for example, not less than 0.5 nm and not more than 6 nm.

In the embodiment, the first operation OP1 and the second operation OP2 may be performed. These operations may be performed in a switched manner. In the first operation OP1, the element current ic supplied between the first magnetic pole 31 and the second magnetic pole 32 flows from the first magnetic pole 31 to the second magnetic pole 32. In the second operation OP2, the element current ic flows from the second magnetic pole 32 to the first magnetic pole 31.

Hereinafter, the differential electrical resistance of the magnetic element 20 when the voltage Va1 applied to the magnetic element 20 is changed will be illustrated.

FIGS. 11 to 14 are graphs illustrating the characteristics of the magnetic heads according to the first embodiment.

The horizontal axis of these figures is voltage Va1 applied to the magnetic element 20. The vertical axis is the differential electrical resistance Rd1 of the magnetic element 20. The voltage Va1 may be a voltage between the first terminal T1 and the second terminal T2. For example, a voltage corresponding to the voltage Va1 is applied to the magnetic element 20.

When the voltage Va1 is positive, the potential of the first magnetic pole 31 is higher than the potential of the second magnetic pole 32. When the voltage Va1 is negative, the potential of the first magnetic pole 31 is lower than the potential of the second magnetic pole 32. The first operation OP1 is performed when the voltage Va1 is positive. The second operation OP2 is performed when the voltage Va1 is negative.

Figure 11:
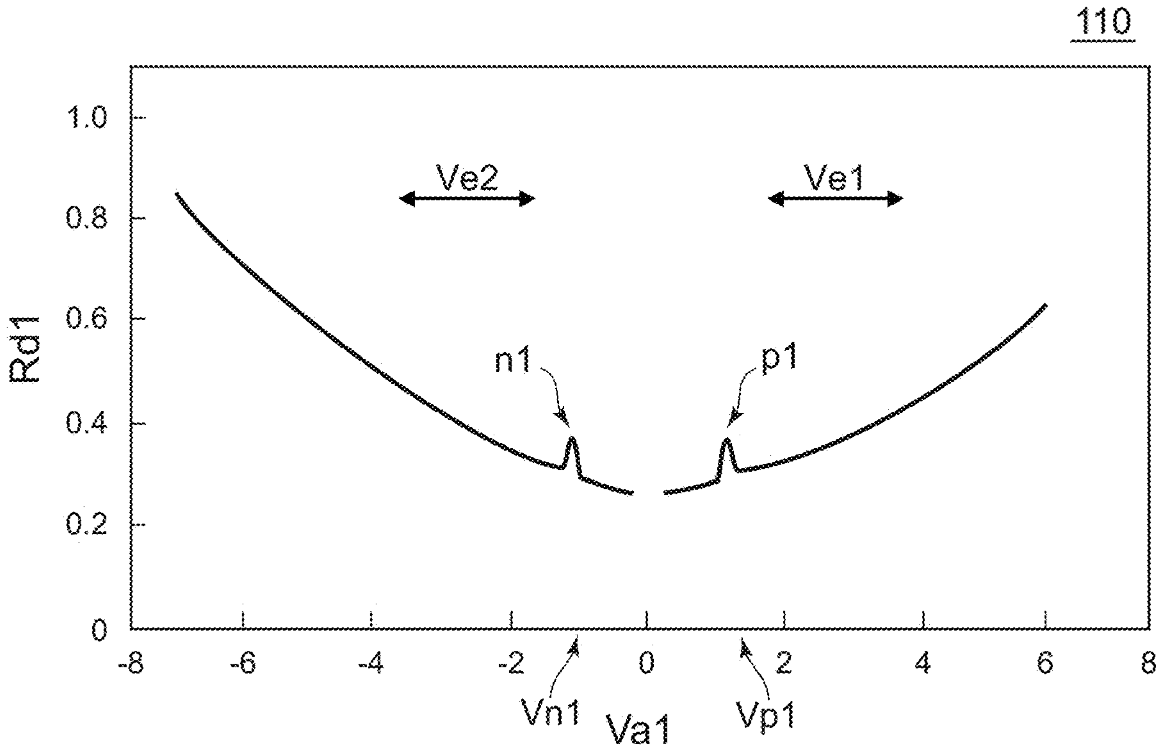
FIG. 11 is a graph illustrating the characteristics of the magnetic head according to the first embodiment.

As shown in FIG. 11, in the magnetic head 110, the differential electrical resistance Rd1 when the voltage Va1 is changed includes multiple peaks. These peaks are considered to correspond to discontinuous changes in electrical resistance due to reversal of magnetization of the plurality of magnetic layers included in the magnetic element 20.

In the magnetic head 110, the plurality of peaks include a first negative peak n1 and a first positive peak p1. The voltage Va1 corresponding to the first negative peak n1 is the first negative peak voltage Vn1. The voltage Va1 corresponding to the first positive peak p1 is the first positive peak voltage Vp1. In the first operation OP1, the voltage Va1 is in a first voltage range Ve1. The first voltage range Ve1 is, for example, higher than the first positive peak voltage Vp1. In the second operation OP2, the voltage Va1 is in a second voltage range Ve2. The second voltage range Ve2 is, for example, lower than the first negative peak voltage Vn1.

Figure 12:
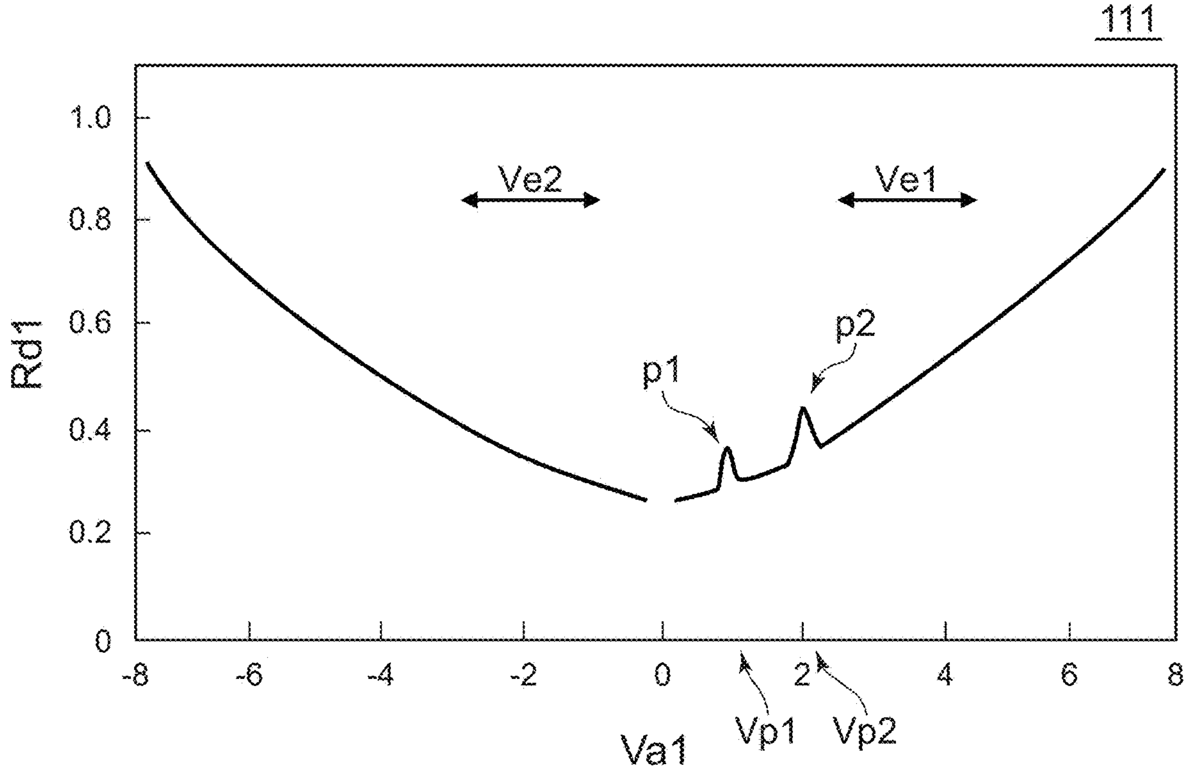
FIG. 12 is a graph illustrating the characteristics of the magnetic head according to the first embodiment.

FIG. 12 corresponds to the magnetic head 111. In the magnetic head 111, the plurality of peaks include the first positive peak p1 and a second positive peak p2. The voltage Va1 corresponding to the second positive peak p2 is the second positive peak voltage Vp2. The second positive peak voltage Vp2 is higher than the first positive peak voltage Vp1. In the first operation OP1, the voltage Va1 is in the first voltage range Ve1. The first voltage range Ve1 is, for example, higher than the second positive peak voltage Vp2.

Figure 13:
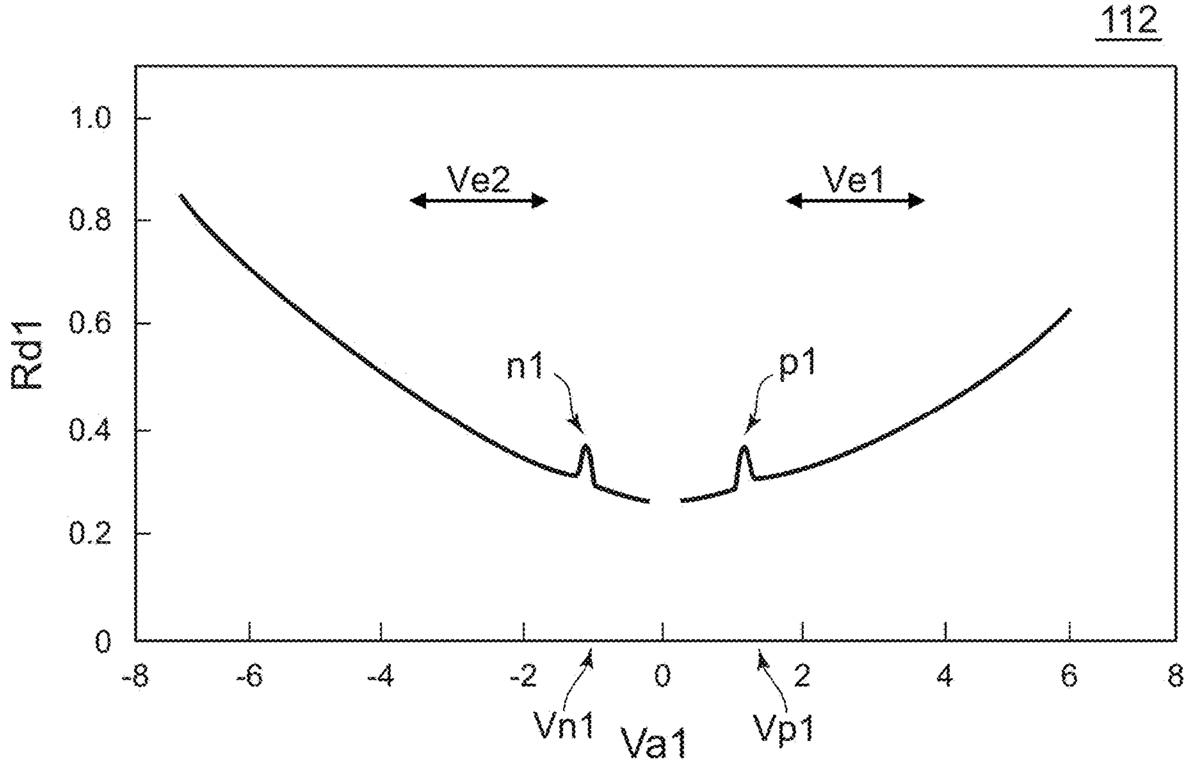
FIG. 13 is a graph illustrating the characteristics of the magnetic head according to the first embodiment.

FIG. 13 corresponds to the magnetic head 112. In the magnetic head 112, the plurality of peaks include the first negative peak n1 and the first positive peak p1. In the first operation OP1, the voltage Va1 is in the first voltage range Ve1. The first voltage range Ve1 is higher than the first positive peak voltage Vp1. In the second operation OP2, the voltage Va1 is in the second voltage range Ve2. The second voltage range Ve2 is, for example, lower than the first negative peak voltage Vn1.

Figure 14:
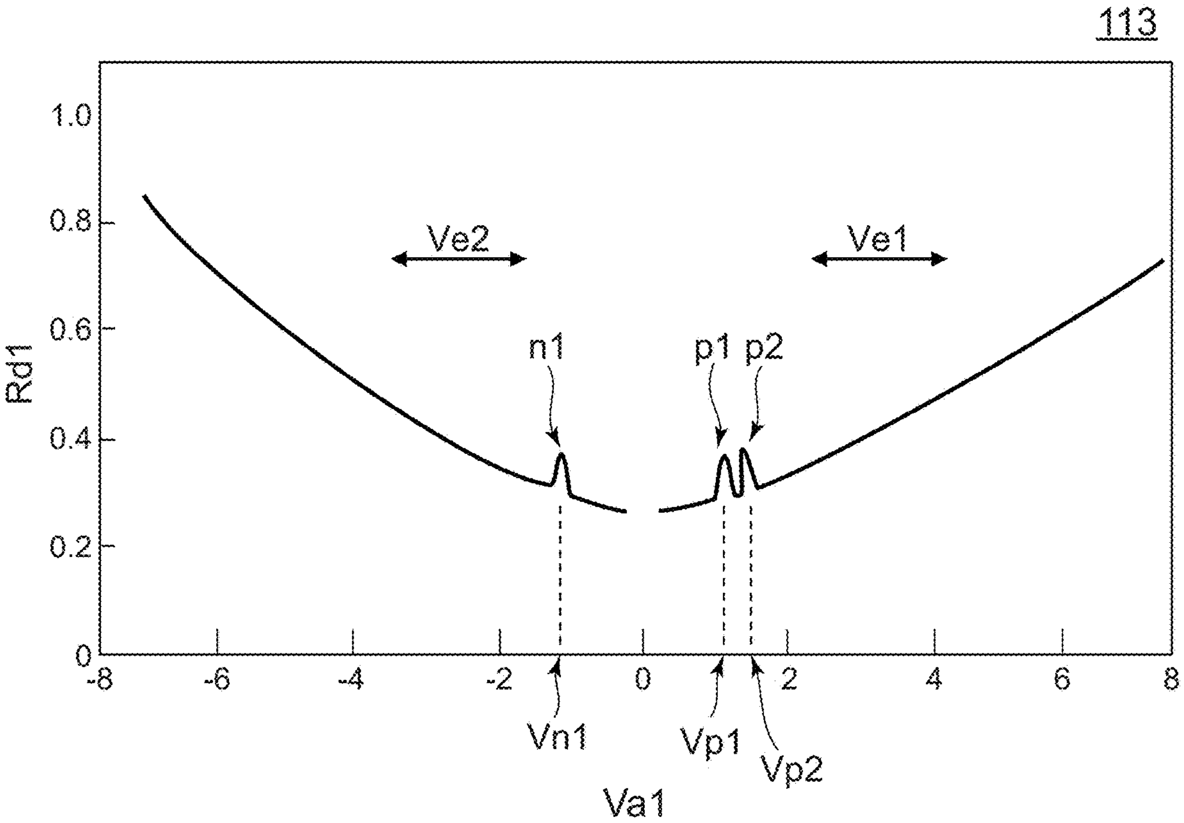
FIG. 14 is a graph illustrating the characteristics of the magnetic head according to the first embodiment.

FIG. 14 corresponds to the magnetic head 113. In the magnetic head 113, the plurality of peaks include the first negative peak n1, the first positive peak p1, and the second positive peak p2. In the first operation OP1, the voltage Va1 is in the first voltage range Ve1. The first voltage range Ve1 is, for example, higher than the second positive peak voltage Vp2. In the second operation OP2, the voltage Va1 is the second voltage range Ve2. The second voltage range Ve2 is, for example, lower than the first negative peak voltage Vn1.

Second Embodiment

The second embodiment relates to the magnetic recording device 210. The magnetic recording device 210 includes the magnetic head, the magnetic recording medium 80, the element circuit 20D, and the controller 75. The magnetic head is configured to record information on the magnetic recording medium 80.

In the second embodiment, the magnetic head may have the configuration illustrated in any one of FIGS. 7 to 10, for example. The magnetic head includes the first magnetic pole 31, the second magnetic pole 32, and the magnetic element 20 provided between the first magnetic pole 31 and the second magnetic pole 32. The magnetic element 20 includes the first magnetic layer 21 provided between a first magnetic pole 31 and a second magnetic pole 32, and the second magnetic layer 22 provided between the first magnetic layer 21 and second magnetic pole 32, the third magnetic layer 23 provided between the second magnetic layer 22 and the second magnetic pole 32, and the fourth magnetic layer 24 provided between the third magnetic layer 23 and the second magnetic pole 32. The magnetic element 20 may include the first nonmagnetic layer 41, the second nonmagnetic layer 42, the third nonmagnetic layer 43, the fourth nonmagnetic layer 44, and the fifth nonmagnetic layer 45. The magnetic element 20 may further include the fifth magnetic layer 25 and the sixth nonmagnetic layer 46 (see FIG. 10).

The element circuit 20D is configured to supply the element current ic between the first magnetic pole 31 and the second magnetic pole 32. The element circuit 20D is configured to perform the first operation OP1 and the second operation OP2. In the first operation OP1, the element current ic flows from the first magnetic pole 31 to the second magnetic pole 32. In the second operation OP2, the element current ic flows from the second magnetic pole 32 to the first magnetic pole 31.

In the first operation OP1 and the second operation OP2, the characteristics described with reference to FIG. 4 are obtained. In the first operation OP1, although the oscillation strength SR1 is relatively low at the beginning of switching, a high oscillation strength SR1 is obtained a long time after the switching. In the second operation OP2, although a relatively high oscillation strength SR1 is obtained at the beginning of switching, the oscillation strength SR1 is relatively low after a long period of time after switching. The first operation OP1 or the second operation OP2 is switched and executed based on recording conditions that match these characteristics.

In the second embodiment, in the magnetic element 20, the first area of the first face F1 may be the same as the second area of the second face F2. The first area may be larger than the second area. The first area may be smaller than the second area. In the second embodiment, the operation of the controller 75 is changed depending on recording conditions.

Figure 15:
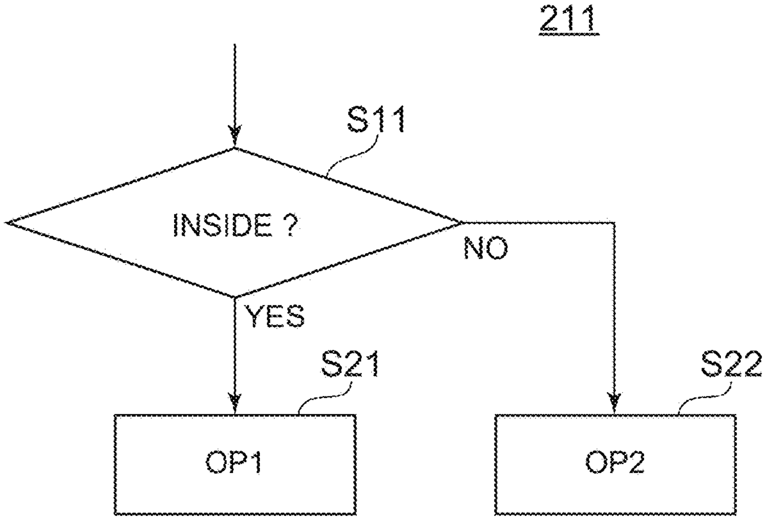
FIG. 15 is a flowchart illustrating the operation of a magnetic recording device according to a second embodiment.

FIG. 15 is a flowchart illustrating the operation of a magnetic recording device according to the second embodiment.

As shown in FIG. 15, in a magnetic recording device 211 according to the embodiment, the controller 75 determines whether the recording position on the magnetic recording medium 80 is inside a determined position (step S11). If the recording position on the magnetic recording medium 80 is inside the determined position, the controller 75 causes the element circuit 20D to perform the first operation OP1 (step S21). If the recording position on the magnetic recording medium 80 is not inside the determined position, the controller 75 causes the element circuit 20D to perform the second operation OP2 (step S22).

The magnetic recording medium 80 is disk-shaped. When the recording position is inside, the first operation OP1 is performed. When the recording position is outside, the second operation OP2 is performed. Thereby, high-density recording can be performed at high speed.

Figure 16:
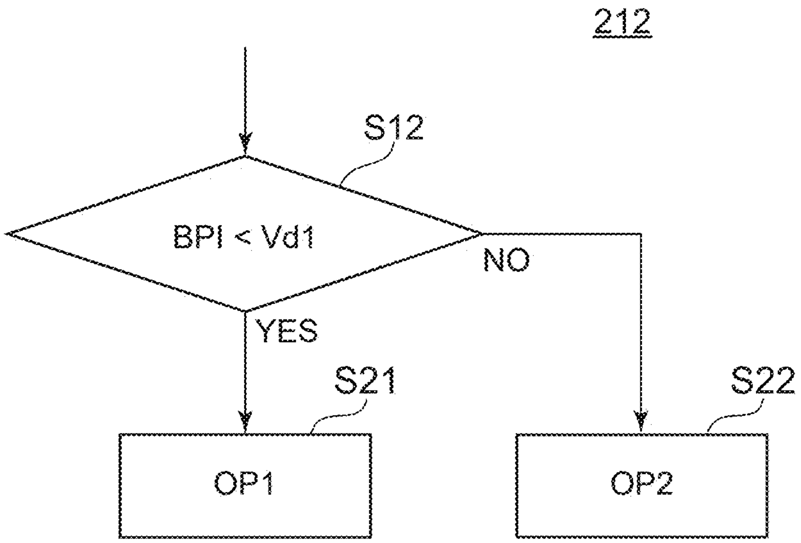
FIG. 16 is a flowchart illustrating the operation of a magnetic recording device according to the second embodiment.

FIG. 16 is a flowchart illustrating the operation of a magnetic recording device according to the second embodiment.

As shown in FIG. 16, in a magnetic recording device 212 according to the embodiment, the controller 75 determines whether the recording density in the circumferential direction is lower than a determined density Vd1 (step S12). If the recording density in the circumferential direction is lower than the determined density Vd1, the controller 75 causes the element circuit 20D to perform the first operation OP1 (step S21). If the recording density in the circumferential direction is not lower than the determined density Vd1, the controller 75 causes the element circuit 20D to perform the second operation OP2 (step S22).

For example, in the case of low BPI (Bit per Inch), the first operation OP1 is performed. For example, when the high BPI is high, the second operation OP2 is performed. Thereby, high-density recording can be performed at high speed.

Figure 17:
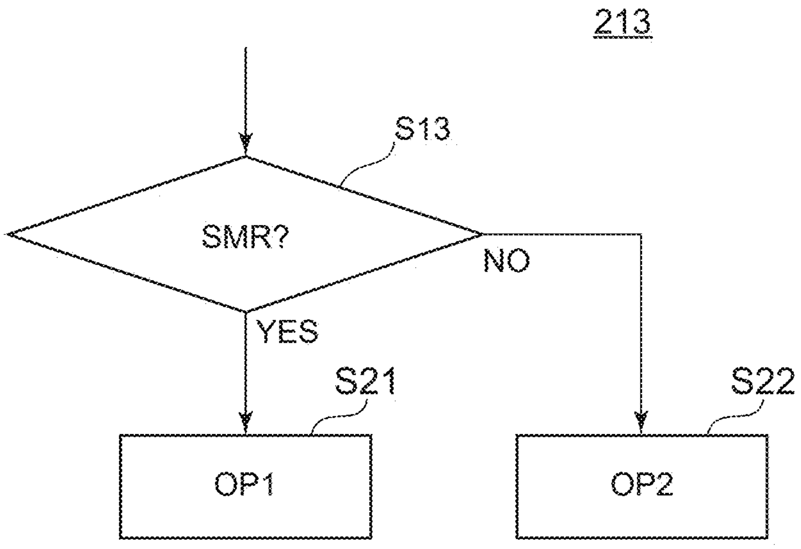
FIG. 17 is a flowchart illustrating the operation of a magnetic recording device according to the second embodiment.

FIG. 17 is a flowchart illustrating the operation of a magnetic recording device according to the second embodiment.

As shown in FIG. 17, in a magnetic recording device 213 according to the embodiment, the controller 75 determines whether shingled magnetic recording (SMR) is to be performed (step S13). If performing shingle recording, the controller 75 causes the element circuit 20D to perform the first operation OP1 (step S21). If performing recording other than shingled recording, the controller 75 causes the element circuit 20D to perform the second operation OP2 (step S22).

For example, when performing shingled recording, the first operation OP1 is performed. For example, when CMR (Conventional Magnetic Recording) recording is performed, the second operation OP2 is performed. Thereby, high-density recording can be performed at high speed.

Hereinafter, examples of other configurations regarding the magnetic recording device according to the embodiment will be described.

Figure 18:
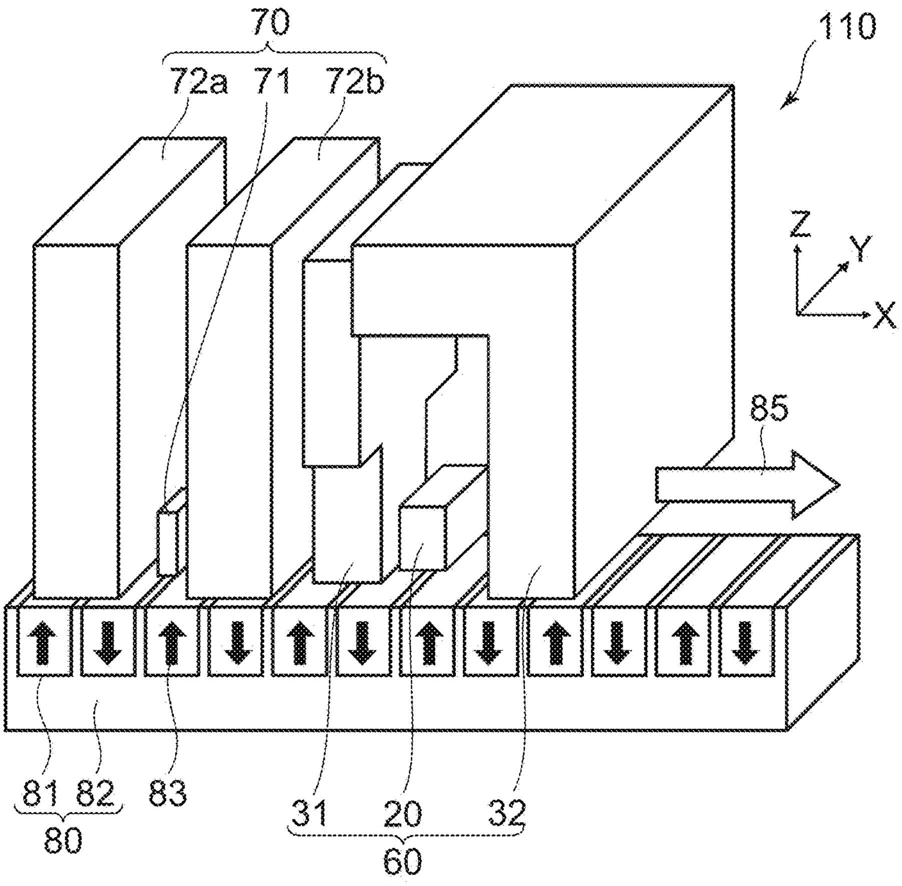
FIG. 18 is a schematic perspective view illustrating a magnetic recording device according to an embodiment.

FIG. 18 is a schematic perspective view illustrating a magnetic recording device according to an embodiment.

As shown in FIG. 18, the magnetic head (e.g., magnetic head 110) according to the embodiment is used together with the magnetic recording medium 80. In this example, the magnetic head 110 includes the recording section 60 and the reproducing section 70. Information is recorded on the magnetic recording medium 80 by the recording section 60 of the magnetic head 110. The reproducing section 70 reproduces information recorded on the magnetic recording medium 80.

The magnetic recording medium 80 includes, for example, a medium substrate 82 and a magnetic recording layer 81 provided on the medium substrate 82. Magnetization 83 of the magnetic recording layer 81 is controlled by the recording section 60.

The reproducing section 70 includes, for example, a first reproducing magnetic shield 72*a*, a second reproducing magnetic shield 72*b*, and a magnetic reproducing element 71. The magnetic reproducing element 71 is provided between the first reproducing magnetic shield 72*a* and the second reproducing magnetic shield 72*b*. The magnetic reproducing element 71 can output a signal according to the magnetization 83 of the magnetic recording layer 81.

As shown in FIG. 18, the magnetic recording medium 80 moves relative to the magnetic head 110 in a medium movement direction 85. The magnetic head 110 controls information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 19:
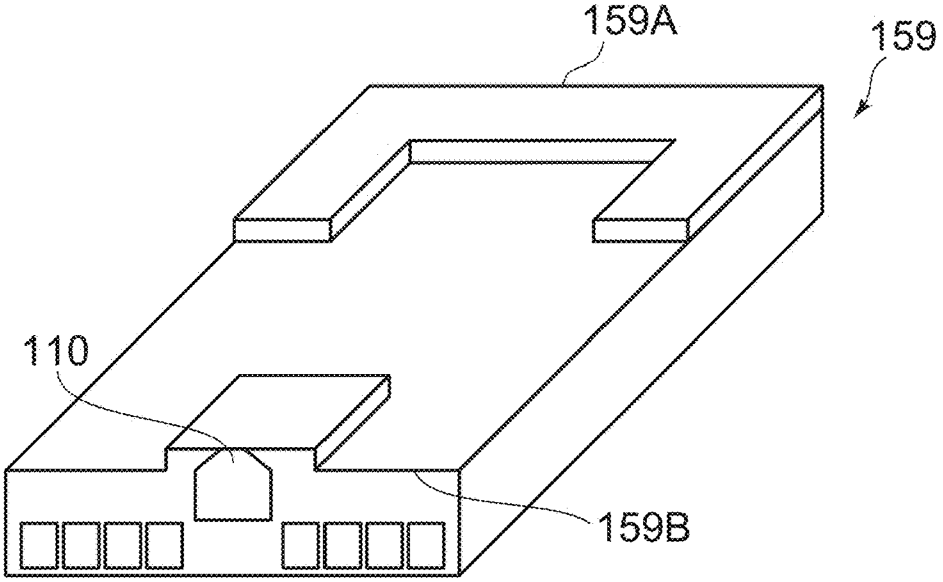
FIG. 19 is a schematic perspective view illustrating a part of the magnetic recording device according to the embodiment.

FIG. 19 is a schematic perspective view illustrating a part of the magnetic recording device according to the embodiment.

FIG. 19 illustrates a head slider.

The magnetic head 110 is provided on the head slider 159. The head slider 159 includes, for example, $Al_2O_3$/TIC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side face of the air outflow side 159B of the head slider 159 or the like. As a result, the magnetic head 110 moves relative to the magnetic recording medium while flying above or in contact with the magnetic recording medium.

Figure 20:
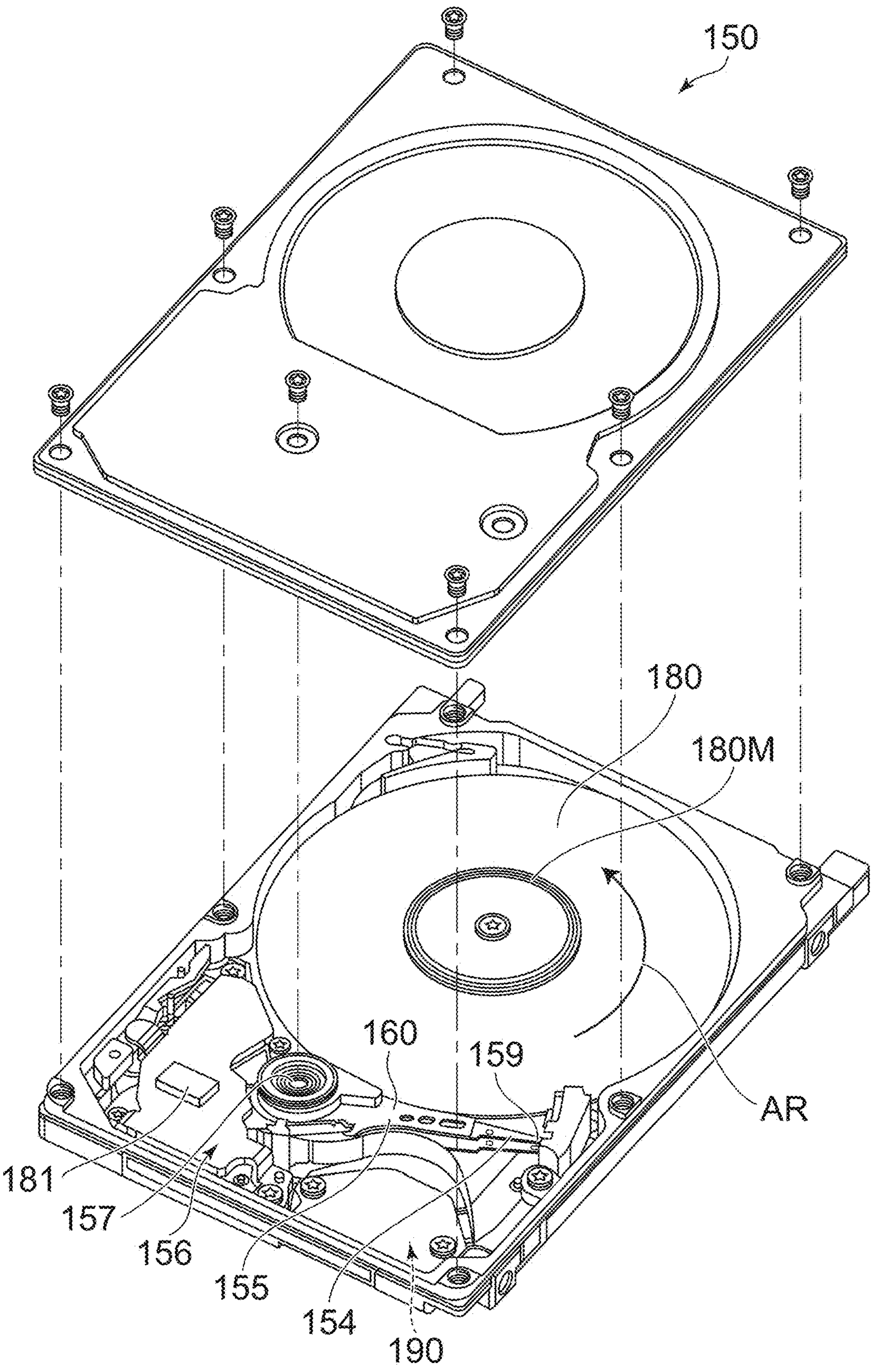
FIG. 20 is a schematic perspective view illustrating the magnetic recording device according to the embodiment.

FIG. 20 is a schematic perspective view illustrating the magnetic recording device according to the embodiment.

Figure 21A:
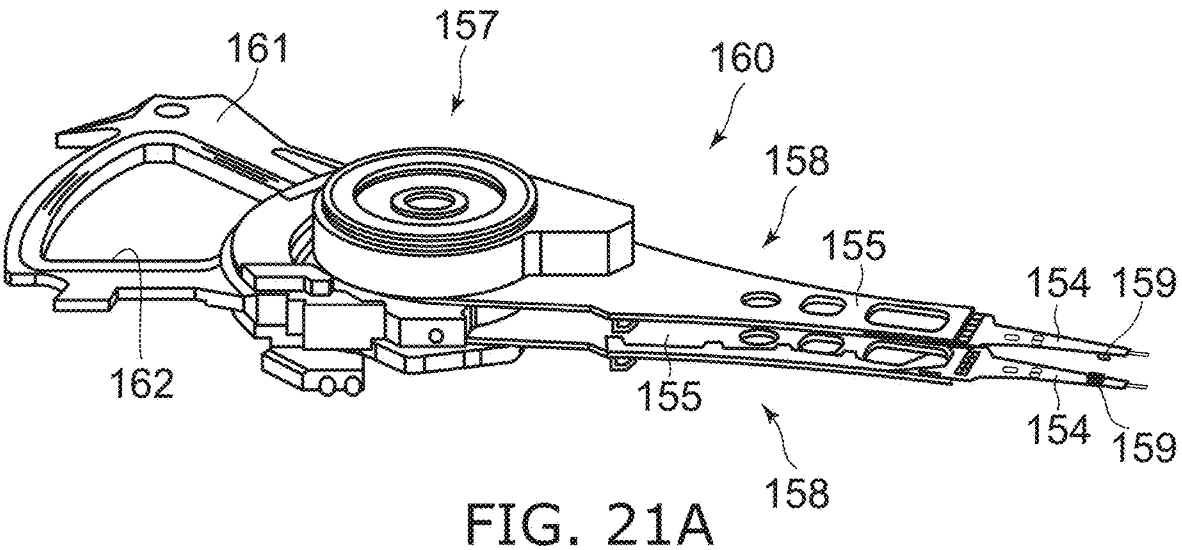
FIGS. 21A and 21B are schematic perspective views illustrating a part of the magnetic recording device according to the embodiment.
Figure 21B:
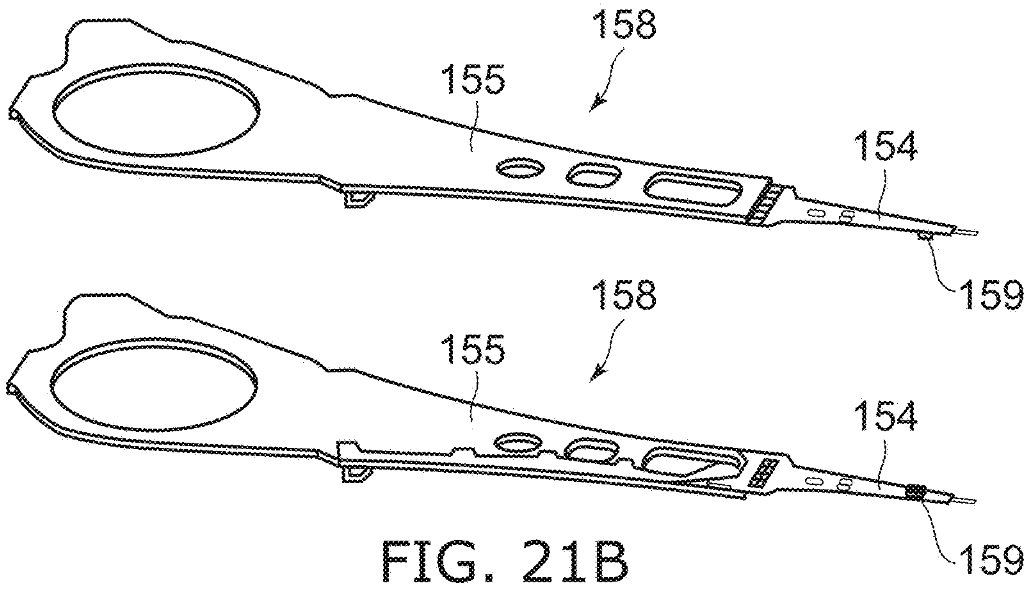

FIGS. 21A and 21B are schematic perspective views illustrating a part of the magnetic recording device according to the embodiment.

As shown in FIG. 20, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing face (ABS) of the head slider 159 are balanced. The distance between the medium facing face of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 21A is an enlarged perspective view of the head stack assembly 160, illustrating the configuration of a part of the magnetic recording device.

FIG. 21B is a perspective view illustrating the magnetic head assembly (head gimbal assembly: HGA) 158 that forms part of the head stack assembly 160.

As shown in FIG. 21A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 21B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following Technical proposals:

(Technical Proposal 1)

A magnetic head, comprising:

a first magnetic pole;

a second magnetic pole;

a magnetic element provided between the first magnetic pole and the second magnetic pole in a first direction from the first magnetic pole to the second magnetic pole, the magnetic element including:

a first magnetic layer provided between the first magnetic pole and the second magnetic pole, a second magnetic layer provided between the first magnetic layer and the second magnetic pole, a third magnetic layer provided between the second magnetic layer and the second magnetic pole, and a fourth magnetic layer provided between the third magnetic layer and the second magnetic pole, the first magnetic layer including a first face facing the first magnetic pole, the fourth magnetic layer including a second face facing the second magnetic pole, and a first area of the first face being larger than a second area of the second face.

(Technical Proposal 2)

The magnetic head according to Technical proposal 1, wherein the first magnetic pole includes a medium facing face, a first length of the first face along a second direction is longer than a second length of the second face along the second direction, and the second direction is along the medium facing face and perpendicular to the first direction.

(Technical Proposal 3)

The magnetic head according to Technical proposal 2, wherein the first face includes a first end and a first other end, a direction from the first other end to the first end is along the second direction, the second face includes a second end and a second other end, a direction from the second other end to the second end is along the second direction, a distance between the first end and the second end is shorter than a distance between the first end and the second other end, and a first angle between a first straight line passing through the first end and the second end, and a direction perpendicular to the first face is not less than 5 degrees and not more than 15 degrees.

(Technical Proposal 4)

The magnetic head according to Technical proposal 3, wherein a second angle between a second straight line passing through the first other end and the second other end, and the direction perpendicular to the first face is not less than 5 degrees and not more than 15 degrees.

(Technical Proposal 5)

The magnetic head according to any one of Technical proposals 1-4, wherein the magnetic element includes:

a first nonmagnetic layer provided between the first magnetic pole and the first magnetic layer;

a second nonmagnetic layer provided between the first magnetic layer and the second magnetic layer;

a third nonmagnetic layer provided between the second magnetic layer and the third magnetic layer;

a fourth nonmagnetic layer provided between the third magnetic layer and the fourth magnetic layer; and a fifth nonmagnetic layer provided between the fourth magnetic layer and the second magnetic pole.

(Technical Proposal 6)

The magnetic head according to Technical proposal 5, wherein the first nonmagnetic layer includes at least one selected from the group consisting of Cu, Au, Cr, V, Al, and Ag, the second nonmagnetic layer includes at least one selected from the group consisting of Ru, Ir, Ta, Rh, Pd, Pt, and W, the third nonmagnetic layer includes at least one selected from the group consisting of Cu, Au, Cr, V, Al, and Ag, the fourth nonmagnetic layer includes at least one selected from the group consisting of Cu, Au, Cr, V, Al, and Ag, and the fifth nonmagnetic layer includes at least one selected from the group consisting of Ru, Ir, Ta, Rh, Pd, Pt, and W.

(Technical Proposal 7)

The magnetic head according to Technical proposal 6, wherein a first thickness of the first magnetic layer along the first direction is thicker than a second thickness of the second magnetic layer along the first direction, and a third thickness of the third magnetic layer along the first direction is thicker than a fourth thickness of the fourth magnetic layer along the first direction.

(Technical Proposal 8)

The magnetic head according to Technical proposal 5, wherein the first nonmagnetic layer includes at least one selected from the group consisting of Cu, Au, Cr, V, Al, and Ag, the second nonmagnetic layer includes at least one selected from the group consisting of Cu, Au, Cr, V, Al, and Ag, the third nonmagnetic layer includes at least one selected from the group consisting of Ru, Ir, Ta, Rh, Pd, Pt, and W,
the fourth nonmagnetic layer includes at least one selected from the group consisting of Cu, Au, Cr, V, Al, and Ag, and
the fifth nonmagnetic layer includes at least one selected from the group consisting of Ru, Ir, Ta, Rh, Pd, Pt, and W.

(Technical Proposal 9)

The magnetic head according to Technical proposal 8, wherein
a first thickness of the first magnetic layer along the first direction is thicker than a second thickness of the second magnetic layer along the first direction, and
a third thickness of the third magnetic layer along the first direction is thicker than a fourth thickness of the fourth magnetic layer along the first direction.

(Technical Proposal 10)

The magnetic head according to Technical proposal 5, wherein
the first nonmagnetic layer includes at least one selected from the group consisting of Cu, Au, Cr, V, Al, and Ag,
the second nonmagnetic layer includes at least one selected from the group consisting of Cu, Au, Cr, V, Al, and Ag,
the third nonmagnetic layer includes at least one selected from the group consisting of Ru, Ir, Ta, Rh, Pd, Pt, and W,
the fourth nonmagnetic layer includes at least one selected from the group consisting of Cu, Au, Cr, V, Al, and Ag, and
the fifth nonmagnetic layer includes at least one selected from the group consisting of Ru, Ir, Ta, Rh, Pd, Pt, and W.

(Technical Proposal 11)

The magnetic head according to Technical proposal 10, wherein
a first thickness of the first magnetic layer along the first direction is thicker than a second thickness of the second magnetic layer along the first direction, and
a third thickness of the third magnetic layer along the first direction is thinner than a fourth thickness of the fourth magnetic layer along the first direction.

(Technical Proposal 12)

The magnetic head according to any one of Technical proposals 5-11, wherein
the first nonmagnetic layer is in contact with the first magnetic pole and the first magnetic layer,
the second non-magnetic layer is in contact with the first magnetic layer and the second magnetic layer,
the third non-magnetic layer is in contact with the second magnetic layer and the third magnetic layer,
the fourth nonmagnetic layer is in contact with the third magnetic layer and the fourth magnetic layer, and
the fifth nonmagnetic layer is in contact with the fourth magnetic layer and the second magnetic pole.

(Technical Proposal 13)

The magnetic head according to Technical proposal 5, wherein
the magnetic element further includes:
a fifth magnetic layer provided between the third non-magnetic layer and the third magnetic layer; and
a sixth non-magnetic layer provided between the fifth magnetic layer and the third magnetic layer.

(Technical Proposal 14)

The magnetic head according to Technical proposal 13, wherein
the first nonmagnetic layer includes at least one selected from the group consisting of Cu, Au, Cr, V, Al, and Ag,
the second nonmagnetic layer includes at least one selected from the group consisting of Cu, Au, Cr, V, Al, and Ag,
the third nonmagnetic layer includes at least one selected from the group consisting of Ru, Ir, Ta, Rh, Pd, Pt, and W,
the fourth nonmagnetic layer includes at least one selected from the group consisting of Cu, Au, Cr, V, Al, and Ag,
the fifth nonmagnetic layer includes at least one selected from the group consisting of Ru, Ir, Ta, Rh, Pd, Pt, and W, and
the sixth nonmagnetic layer includes at least one selected from the group consisting of Cu, Au, Cr, V, Al, and Ag.

(Technical Proposal 15)

The magnetic head according to Technical proposal 14, wherein
a first thickness of the first magnetic layer along the first direction is thicker than a second thickness of the second magnetic layer along the first direction,
a third thickness of the third magnetic layer along the first direction is thicker than a fourth thickness of the fourth magnetic layer along the first direction, and
a fifth thickness of the fifth magnetic layer along the first direction is thinner than the third thickness.

(Technical Proposal 16)

The magnetic head according to any one of Technical proposals 1-15, wherein
a first operation and a second operation are performed,
in the first operation, an element current supplied between the first magnetic pole and the second magnetic pole flows from the first magnetic pole to the second magnetic pole, and
in the second operation, the element current flows from the second magnetic pole to the first magnetic pole.

(Technical Proposal 17)

A magnetic recording device, comprising:
the magnetic head according to any one of Technical proposals 1-15; and
an element circuit configured to supply an element current between the first magnetic pole and the second magnetic pole,
the element circuit being configured to perform a first operation and a second operation,
in the first operation, the element current being configured to flow from the first magnetic pole to the second magnetic pole, and
in the second operation, the element current being configured to flow from the second magnetic pole to the first magnetic pole.

(Technical Proposal 18)

A magnetic recording device, comprising:
a magnetic head;
a magnetic recording medium;
an element circuit; and
a controller,
the magnetic head being configured to record information on the magnetic recording medium,
the magnetic head including:
a first magnetic pole,
a second magnetic pole, and
a magnetic element provided between the first magnetic pole and the second magnetic pole, the magnetic element including:

a first magnetic layer provided between the first magnetic pole and the second magnetic pole, a second magnetic layer provided between the first magnetic layer and the second magnetic pole, a third magnetic layer provided between the second magnetic layer and the second magnetic pole, and a fourth magnetic layer provided between the third magnetic layer and the second magnetic pole, the element circuit being configured to supply an element current between the first magnetic pole and the second magnetic pole, the element circuit being configured to perform a first operation and a second operation, in the first operation, the element current being configured to flow from the first magnetic pole to the second magnetic pole, in the second operation, the element current being configured to flow from the second magnetic pole to the first magnetic pole, the controller being configured to cause the element circuit to perform the first operation when a recording position on the magnetic recording medium being inside a determined position, and the controller being configured to cause the element circuit to perform the second operation when the recording position on the magnetic recording medium being not inside the determined position.

(Technical Proposal 19)

A magnetic recording device, comprising:

a magnetic head;

a magnetic recording medium;

an element circuit; and a controller, the magnetic head being configured to record information on the magnetic recording medium, the magnetic head including:

a first magnetic pole, a second magnetic pole, and a magnetic element provided between the first magnetic pole and the second magnetic pole, the magnetic element including:

a first magnetic layer provided between the first magnetic pole and the second magnetic pole, a second magnetic layer provided between the first magnetic layer and the second magnetic pole, a third magnetic layer provided between the second magnetic layer and the second magnetic pole, and a fourth magnetic layer provided between the third magnetic layer and the second magnetic pole, the element circuit being configured to supply an element current between the first magnetic pole and the second magnetic pole, the element circuit being configured to perform a first operation and a second operation, in the first operation, the element current being configured to flow from the first magnetic pole to the second magnetic pole, in the second operation, the element current being configured to flow from the second magnetic pole to the first magnetic pole, the controller being configured to cause the element circuit to perform the first operation when a recording density in a circumferential direction being lower than a determined density, and the controller being configured to cause the element circuit to perform the second operation when the recording density in the circumferential direction being not lower than the determined density.

(Technical Proposal 20)

A magnetic recording device, comprising:

a magnetic head;

a magnetic recording medium;

an element circuit; and a controller, the magnetic head being configured to record information on the magnetic recording medium, the magnetic head including:

a first magnetic pole, a second magnetic pole, and a magnetic element provided between the first magnetic pole and the second magnetic pole, the magnetic element including:

a first magnetic layer provided between the first magnetic pole and the second magnetic pole, a second magnetic layer provided between the first magnetic layer and the second magnetic pole, a third magnetic layer provided between the second magnetic layer and the second magnetic pole, and a fourth magnetic layer provided between the third magnetic layer and the second magnetic pole, the element circuit being configured to supply an element current between the first magnetic pole and the second magnetic pole, the element circuit being configured to perform a first operation and a second operation, in the first operation, the element current being configured to flow from the first magnetic pole to the second magnetic pole, in the second operation, the element current being configured to flow from the second magnetic pole to the first magnetic pole, the controller being configured to cause the element circuit to perform the first operation for performing shingle recording, and the controller being configured to cause the element circuit to perform the second operation for performing recording being not the shingle recording.

According to the embodiment, a magnetic recording device that can improve recording density can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles, magnetic elements, magnetic layers, non-magnetic layers, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and all magnetic recording devices practicable by an appropriate design modification by one skilled in the art based on the magnetic heads and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:

a first magnetic pole;

a second magnetic pole;

a magnetic element provided between the first magnetic pole and the second magnetic pole in a first direction from the first magnetic pole to the second magnetic pole, the magnetic element including:

a first magnetic layer provided between the first magnetic pole and the second magnetic pole, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, the first magnetic layer including a first face facing the first magnetic pole, the fourth magnetic layer including a second face facing the second magnetic pole, a first area of the first face being larger than a second area of the second face, a first nonmagnetic layer provided between the first magnetic pole and the first magnetic layer;

a second nonmagnetic layer provided between the first magnetic layer and the second magnetic layer;

a third nonmagnetic layer provided between the second magnetic layer and the third magnetic layer;

a fourth nonmagnetic layer provided between the third magnetic layer and the fourth magnetic layer; and a fifth nonmagnetic layer provided between the fourth magnetic layer and the second magnetic pole, wherein a first thickness of the first magnetic layer along the first direction is thicker than a second thickness of the second magnetic layer along the first direction, and a third thickness of the third magnetic layer along the first direction is thinner than a fourth thickness of the fourth magnetic layer along the first direction.

2. The magnetic head according to claim 1, wherein the first magnetic pole includes a medium facing face, a first length of the first face along a second direction is longer than a second length of the second face along the second direction, and the second direction is along the medium facing face and perpendicular to the first direction.

3. The magnetic head according to claim 2, wherein the first face includes a first end and a first other end, a direction from the first other end to the first end is along the second direction, the second face includes a second end and a second other end, a direction from the second other end to the second end is along the second direction, a distance between the first end and the second end is shorter than a distance between the first end and the second other end, and a first angle between a first straight line passing through the first end and the second end, and a direction perpendicular to the first face is not less than 5 degrees and not more than 15 degrees.

4. The magnetic head according to claim 3, wherein a second angle between a second straight line passing through the first other end and the second other end, and the direction perpendicular to the first face is not less than 5 degrees and not more than 15 degrees.

5. The magnetic head according to claim 1, wherein the first nonmagnetic layer includes at least one selected from the group consisting of Cu, Au, Cr, V, Al, and Ag, the second nonmagnetic layer includes at least one selected from the group consisting of Ru, Ir, Ta, Rh, Pd, Pt, and W, the third nonmagnetic layer includes at least one selected from the group consisting of Cu, Au, Cr, V, Al, and Ag, the fourth nonmagnetic layer includes at least one selected from the group consisting of Cu, Au, Cr, V, Al, and Ag, and the fifth nonmagnetic layer includes at least one selected from the group consisting of Ru, Ir, Ta, Rh, Pd, Pt, and W.

6. The magnetic head according to claim 1, wherein the first nonmagnetic layer includes at least one selected from the group consisting of Cu, Au, Cr, V, Al, and Ag, the second nonmagnetic layer includes at least one selected from the group consisting of Cu, Au, Cr, V, Al, and Ag, the third nonmagnetic layer includes at least one selected from the group consisting of Ru, Ir, Ta, Rh, Pd, Pt, and W, the fourth nonmagnetic layer includes at least one selected from the group consisting of Cu, Au, Cr, V, Al, and Ag, and the fifth nonmagnetic layer includes at least one selected from the group consisting of Ru, Ir, Ta, Rh, Pd, Pt, and W.

7. The magnetic head according to claim 1, wherein the first nonmagnetic layer is in contact with the first magnetic pole and the first magnetic layer, the second nonmagnetic layer is in contact with the first magnetic layer and the second magnetic layer, the third nonmagnetic layer is in contact with the second magnetic layer and the third magnetic layer, the fourth nonmagnetic layer is in contact with the third magnetic layer and the fourth magnetic layer, and the fifth nonmagnetic layer is in contact with the fourth magnetic layer and the second magnetic pole.

8. A magnetic recording device, comprising:

the magnetic head according to claim 1; and an element circuit configured to supply an element current between the first magnetic pole and the second magnetic pole, the element circuit being configured to perform a first operation and a second operation, in the first operation, the element current being configured to flow from the first magnetic pole to the second magnetic pole, and in the second operation, the element current being configured to flow from the second magnetic pole to the first magnetic pole.

9. A magnetic head, comprising:

a first magnetic pole;

a second magnetic pole;

a magnetic element provided between the first magnetic pole and the second magnetic pole in a first direction from the first magnetic pole to the second magnetic pole, the magnetic element including:

a first magnetic layer provided between the first magnetic pole and the second magnetic pole, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, the first magnetic layer including a first face facing the first magnetic pole, the fourth magnetic layer including a second face facing the second magnetic pole, a first area of the first face being larger than a second area of the second face, a first nonmagnetic layer provided between the first magnetic pole and the first magnetic layer;

a second nonmagnetic layer provided between the first magnetic layer and the second magnetic layer;

a third nonmagnetic layer provided between the second magnetic layer and the third magnetic layer;

a fourth nonmagnetic layer provided between the third magnetic layer and the fourth magnetic layer; and a fifth nonmagnetic layer provided between the fourth magnetic layer and the second magnetic pole, wherein the magnetic element further includes:

a fifth magnetic layer provided between the third nonmagnetic layer and the third magnetic layer; and a sixth nonmagnetic layer provided between the fifth magnetic layer and the third magnetic layer.

10. The magnetic head according to claim 9, wherein the first nonmagnetic layer includes at least one selected from the group consisting of Cu, Au, Cr, V, Al, and Ag, the second nonmagnetic layer includes at least one selected from the group consisting of Cu, Au, Cr, V, Al, and Ag, the third nonmagnetic layer includes at least one selected from the group consisting of Ru, Ir, Ta, Rh, Pd, Pt, and W, the fourth nonmagnetic layer includes at least one selected from the group consisting of Cu, Au, Cr, V, Al, and Ag, the fifth nonmagnetic layer includes at least one selected from the group consisting of Ru, Ir, Ta, Rh, Pd, Pt, and W, and the sixth nonmagnetic layer includes at least one selected from the group consisting of Cu, Au, Cr, V, Al, and Ag.

11. The magnetic head according to claim 10, wherein a first thickness of the first magnetic layer along the first direction is thicker than a second thickness of the second magnetic layer along the first direction, a third thickness of the third magnetic layer along the first direction is thicker than a fourth thickness of the fourth magnetic layer along the first direction, and a fifth thickness of the fifth magnetic layer along the first direction is thinner than the third thickness.

* * * * *